US012632772B2

(12) United States Patent (10) Patent No.: US 12,632,772 B2
Cogan et al. (45) Date of Patent: May 19, 2026

(54) METHOD, APPARATUS AND COMPUTER PROGRAM PRODUCT FOR IMPROVING INTERPRETABILITY OF SOFTWARE BLACK-BOX MACHINE LEARNING MODEL OUTPUTS

(71) Applicant: Optum Services (Ireland) Limited, Dublin (IE)

(72) Inventors: Peter Cogan, Dublin (IE); Lorcan B. Mac Manus, Maynooth (IE); Venkata Krishnan Mittinamalli Thandapani, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 1152 days.

(21) Appl. No.: 16/949,359

(22) Filed: Oct. 27, 2020

(65) Prior Publication Data

US 2022/0129781 A1 Apr. 28, 2022

(51) Int. Cl.
*G06N 20/00* (2019.01)
*G06N 5/01* (2023.01)

(52) U.S. Cl.
CPC .............. *G06N 20/00* (2019.01); *G06N 5/01* (2023.01)

(58) Field of Classification Search
CPC .......... G06N 20/00; G06N 3/045; G06N 3/08; G06N 5/01; G06N 3/0499; G06N 3/09
See application file for complete search history.

(56) References Cited

U.S. PATENT DOCUMENTS

| | | | |
|---|---|---|---|
| 8,671,341 B1 | 3/2014 | Hellwig et al. | |
| 9,785,983 B2 | 10/2017 | Zhao et al. | |
| 10,372,878 B2 | 8/2019 | Van Arkel et al. | |
| 10,535,430 B1 | 1/2020 | Fischer et al. | |
| 10,679,299 B2 | 6/2020 | Billings | |
| 11,556,746 B1 * | 1/2023 | Dasgupta ................. | G06N 5/04 |
| 2009/0094064 A1 | 4/2009 | Tyler et al. | |
| 2016/0012544 A1 | 1/2016 | Ramaswamy et al. | |

(Continued)

OTHER PUBLICATIONS

McInerney et al., "Query-Focused EHR Summarization to Aid Imaging Diagnosis", Apr. 26, 2020, arXiv:2004.04645v2, pp. 1-26. ( Year: 2020).*

(Continued)

*Primary Examiner* — Brent Johnston Hoover

(74) *Attorney, Agent, or Firm* — Alston & Bird LLP

(57) ABSTRACT

Methods, apparatuses, systems, computing entities, and/or the like are provided. An example method may include receiving a data object comprising feature metadata and flag metadata generated by at least a software black-box machine learning model via processing the feature metadata associated with the data object; selecting a subset of training data objects from a plurality of training data objects associated with the software black-box machine learning model based at least in part on the feature metadata by mapping the data object into a multi-dimensional mapping space comprising mappings of the plurality of training data objects; determining a subset of note metadata corresponding to the subset of training data objects; generating summary metadata for the data object based at least in part on a plurality of word scores associated with the subset of note metadata; and causing rendering of the summary metadata on a user computing entity.

20 Claims, 14 Drawing Sheets

(56) References Cited

U.S. PATENT DOCUMENTS

| | | |
|---|---|---|
| 2020/0058381 A1 | 2/2020 | Patel |
| 2021/0043211 A1* | 2/2021 | Leidner .................. G06F 16/35 |
| 2021/0049428 A1* | 2/2021 | Huang .................... G06F 17/18 |
| 2021/0049503 A1* | 2/2021 | Nourian .............. G06F 11/3466 |

OTHER PUBLICATIONS

Krause et al., "Interacting with Predictions: Visual Inspection of Black-box Machine Learning Models", May 12, 2016, ACM 978-1-4503-3362-7/16/05, pp. 5686-5697. (Year: 2016).*
Hsu et al., "Characterizing the Value of Information in Medical Notes", Oct. 7, 2020, arXiv:2010.03574v1, pp. 1-15. (Year: 2020).*
Aguilar-Palacios, Carlos et al. "Cold-Start Promotional Sales Forecasting Through Gradient Boosted-Based Contrastive Explanations," IEEE Access. Jul. 27, 2020, vol. 8, pp. 137574-137586. DOI: 10.1109/ACCESS.2020.3012032.

* cited by examiner

900

901 — START

903 — CALCULATE A PLURALITY OF DISTANCE METRICS

905 — IDENTIFY A PREDETERMINED NUMBER FOR THE SUBSET

907 — GENERATE AN ORDERED LIST

909 — SELECT TRAINING NUMERICAL FEATURES

911 — DETERMINE THE SUBSET OF TRAINING DATA OBJECTS

913 — END

METHOD, APPARATUS AND COMPUTER PROGRAM PRODUCT FOR IMPROVING INTERPRETABILITY OF SOFTWARE BLACK-BOX MACHINE LEARNING MODEL OUTPUTS

TECHNOLOGICAL FIELD

Embodiments of the present disclosure relate generally to improving interpretability of software black-box machine learning model outputs. For example, various embodiments of the present disclosure may programmatically generate summary metadata associated with the output of a software black-box machine learning model to improve the interpretability of the output of a software black-box machine learning model.

BACKGROUND

Artificial intelligence and machine learning have great potential for providing various technical advancement and technical benefits not only in the field of computer science, but also in other associated technical fields and applications. Applicant has identified many technical challenges, deficiencies and problems associated with many artificial intelligence and machine learning systems and methods.

For example, many systems and methods do not provide sufficient interpretability and/or explainability of outputs from artificial intelligence and machine learning algorithms or models. The terms "interpretability" or "explainability" refer to a level or a degree that a human being can understand, comprehend, and/or consistently predict the cause, reason, and/or basis of outputs, predictions, and/or decisions from artificial intelligence and/or machine learning algorithms or models. For example, an artificial intelligence (or machine learning) model may provide a higher interpretability (e.g. better interpretable) on its outputs, predictions, and/or decisions than another model if its outputs, predictions, and/or decisions are easier for a human being to understand than those from the other model.

As artificial intelligence and machine learning models being implemented in many fields do not generate linear and/or interpretable outputs, the lack of sufficient interpretability and/or explainability may create many technical issues. In some examples, without sufficient interpretability and/or explainability of outputs from artificial intelligence and machine learning models, data processing based on the outputs may be delayed, which may cause workflow inefficiency and increase unnecessary computer resource usage (for example, unnecessary computer resource consumption when a data processing system stands idle while waiting for the output to be manually interpreted). In some embodiments, insufficient interpretability and/or explainability on outputs from artificial intelligence and machine learning models may result in the outputs being misinterpreted, which in turn may result in computing errors and mistakes in data processing.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code.

The at least one non-transitory memory and the computer program code may be configured to, with the at least one processor, cause the apparatus to receive a data object comprising feature metadata and flag metadata, wherein the flag metadata describes a predictive output for the data object generated by at least a software black-box machine learning model via processing the feature metadata associated with the data object; select, based at least in part on the feature metadata, a subset of training data objects from a plurality of training data objects associated with the software black-box machine learning model by mapping the data object into a multi-dimensional mapping space comprising mappings of the plurality of training data objects; determine a subset of note metadata corresponding to the subset of training data objects; generate, based at least in part on a plurality of word scores associated with the subset of note metadata, summary metadata for the data object; and cause rendering of the summary metadata on a user computing entity.

In some embodiments, when determining the subset of training data objects from the plurality of training data objects, the at least one non-transitory memory and the computer program code are configured to, with the at least one processor, cause the apparatus to further: retrieve a plurality of training feature metadata corresponding to the plurality of training data objects; encode the plurality of training feature metadata to a plurality of training numerical features based at least in part on an encoder algorithm; and encode the feature metadata to a numerical feature based at least in part on the encoder algorithm.

In some embodiments, the encoder algorithm is associated with a CatBoost encoder.

In some embodiments, when selecting the subset of training data objects based further on the plurality of distance metrics, the at least one non-transitory memory and the computer program code are configured to, with the at least one processor, cause the apparatus to further: calculate, based at least in part on the multi-dimensional mapping space, a plurality of distance metrics between the numerical feature for the data object and each of the plurality of training numerical features; and select the subset of training data objects based further on the plurality of distance metrics.

In some embodiments, when selecting the subset of training data objects, the at least one non-transitory memory and the computer program code are configured to, with the at least one processor, cause the apparatus to further: identify a predetermined number for the subset of training data objects; generate an ordered list of the plurality of training numerical features based at least in part on their corresponding distance metrics; select a subset of training numerical features from the ordered list based at least in part on the predetermined number; and determine the subset of training data objects corresponding to the subset of training numerical features.

In some embodiments, when generating the summary metadata, the at least one non-transitory memory and the computer program code are configured to, with the at least one processor, cause the apparatus to further: compute the plurality of word scores based at least in part on the subset of note metadata; and generate a plurality of sentence structures based at least in part on the subset of note metadata.

In some embodiments, each of the plurality of word scores is associated with an Inverse Document Frequency (IDF) value.

In some embodiments, the at least one non-transitory memory and the computer program code are configured to, with the at least one processor, cause the apparatus to further: compute a plurality of sentence scores corresponding to the plurality of sentence structures based at least in part on the plurality of word scores; and select a subset of sentence structures from the plurality of sentence structures based at least in part on the plurality of sentence scores.

In some embodiments, when selecting the subset of sentence structures, the at least one non-transitory memory and the computer program code are configured to, with the at least one processor, cause the apparatus to further: identify a predetermined number for the subset of sentence structures; generate an ordered list of the plurality of sentence structures based at least in part on their corresponding sentence scores; select the predetermined number of sentence structures from the ordered list.

In some embodiments, each sentence structure in the subset of sentence structures satisfies a character number threshold.

In some embodiments, the at least one non-transitory memory and the computer program code are configured to, with the at least one processor, cause the apparatus to further: generate the summary metadata for the data object based at least in part on the subset of sentence structures.

In accordance with various embodiments of the present disclosure, a computer-implemented method is provided. The computer-implemented method may comprise receiving a data object comprising feature metadata and flag metadata, wherein the flag metadata describes a predictive output for the data object generated by at least a software black-box machine learning model via processing the feature metadata associated with the data object; selecting, based at least in part on the feature metadata, a subset of training data objects from a plurality of training data objects associated with the software black-box machine learning model by mapping the data object into a multi-dimensional mapping space comprising mappings of the plurality of training data objects; determining a subset of note metadata corresponding to the subset of training data objects; generating, based at least in part on a plurality of word scores associated with the subset of note metadata, summary metadata for the data object; and causing rendering of the summary metadata on a user computing entity.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to receive a data object comprising feature metadata and flag metadata, wherein the flag metadata describes a predictive output for the data object generated by at least a software black-box machine learning model via processing the feature metadata associated with the data object; select, based at least in part on the feature metadata, a subset of training data objects from a plurality of training data objects associated with the software black-box machine learning model by mapping the data object into a multi-dimensional mapping space comprising mappings of the plurality of training data objects; determine a subset of note metadata corresponding to the subset of training data objects; generate, based at least in part on a plurality of word scores associated with the subset of note metadata, summary metadata for the data object; and cause rendering of the summary metadata on a user computing entity.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 12:
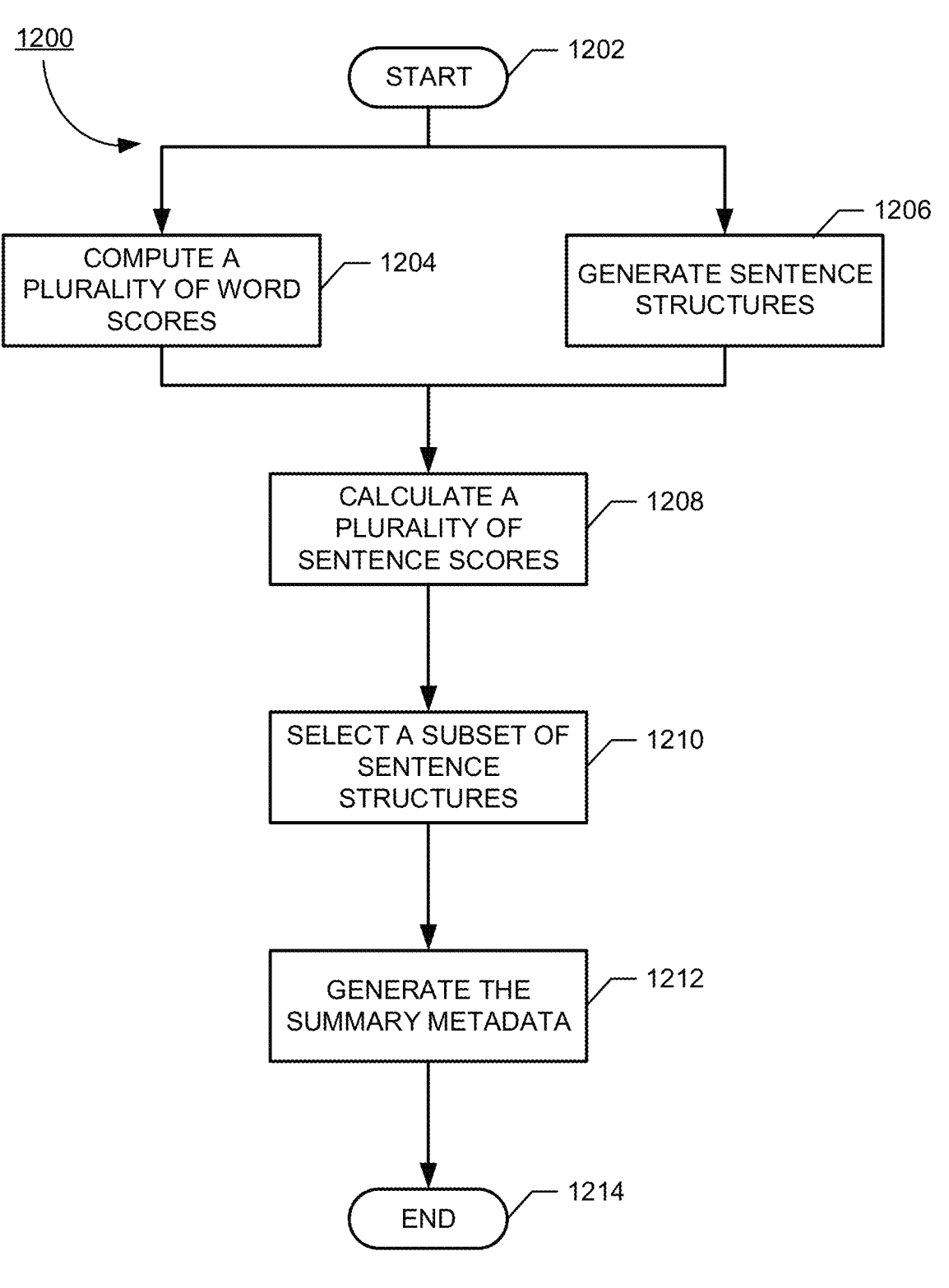
Figure 13:
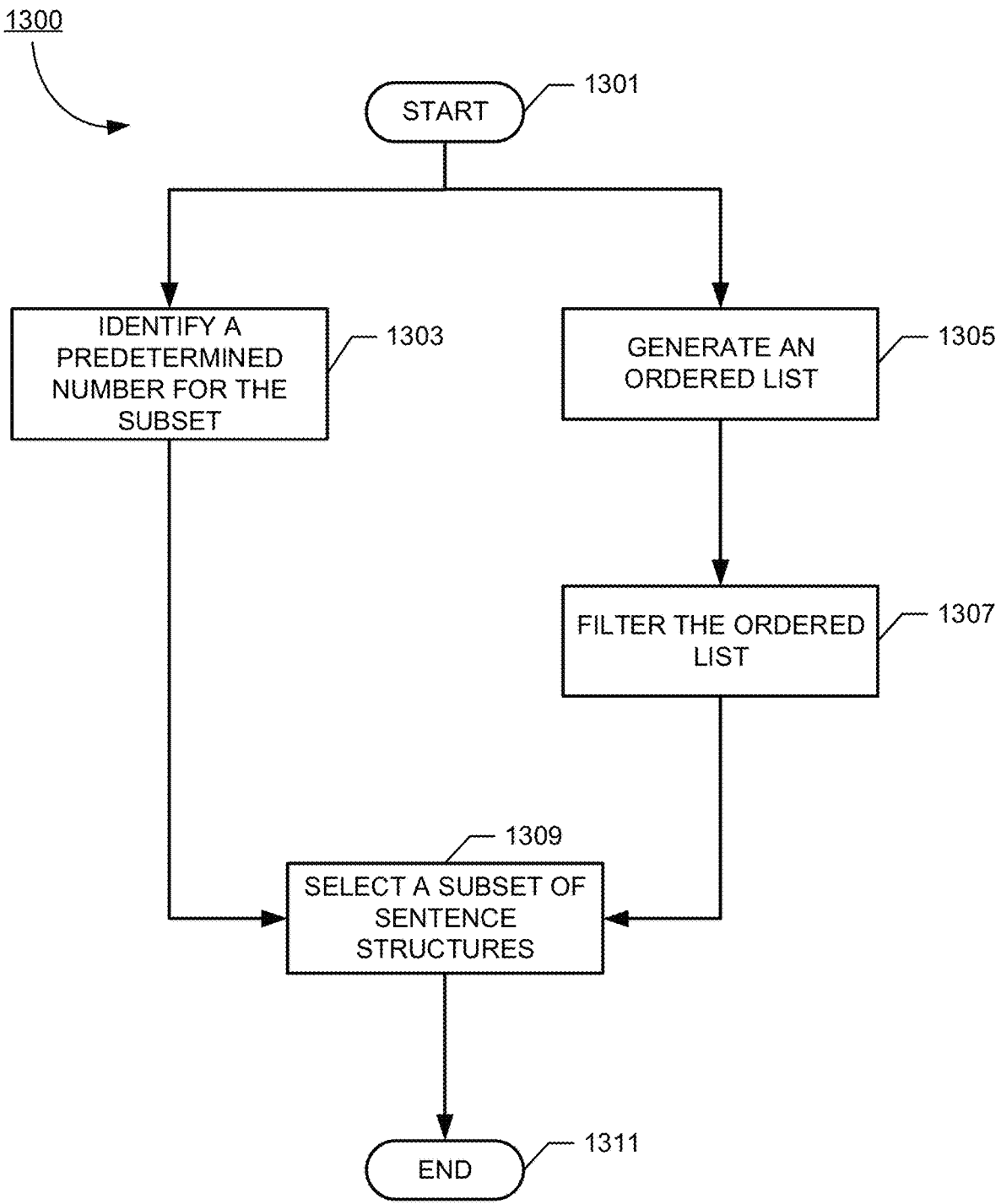
Figure 14:
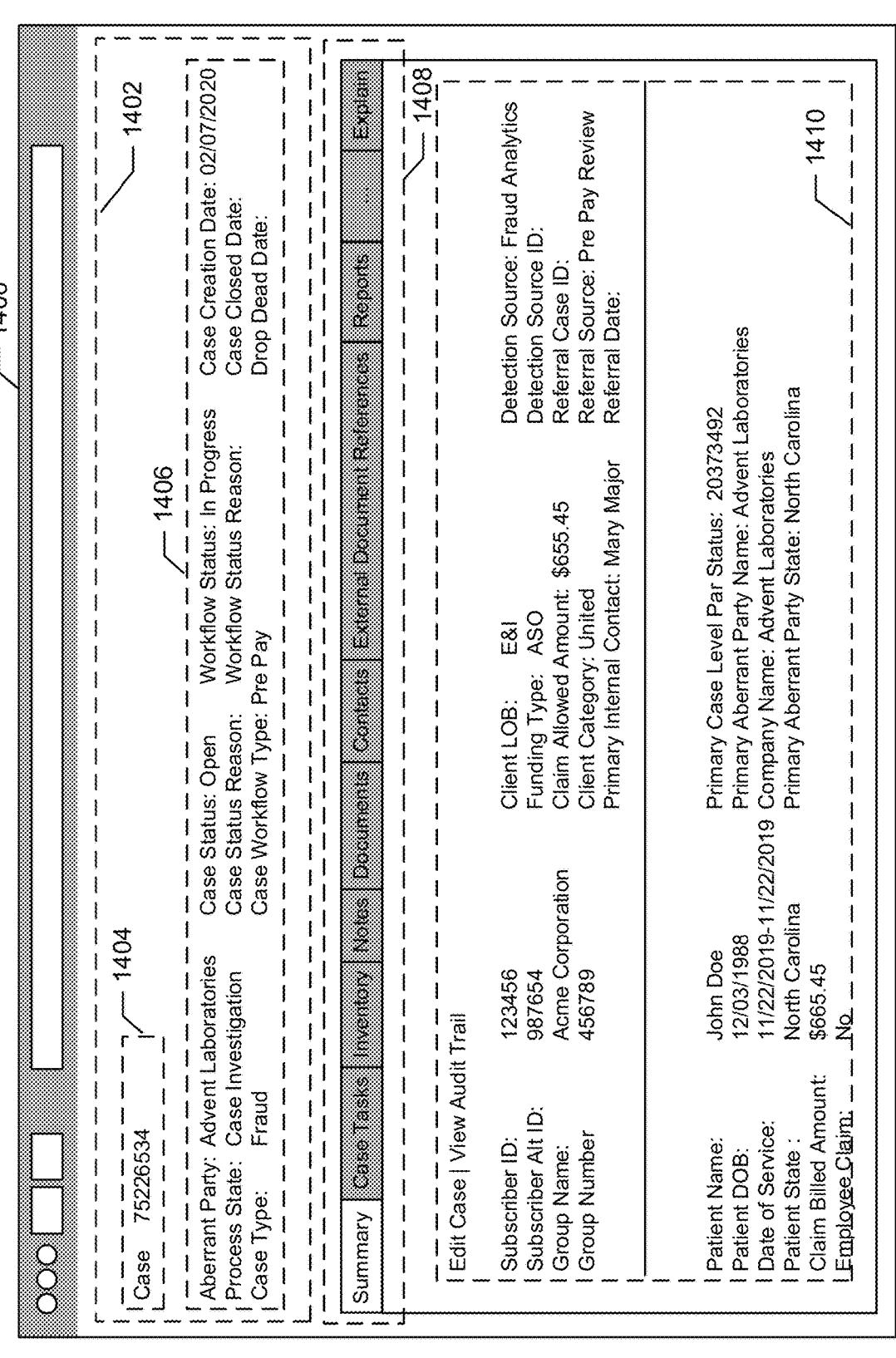
Figure 15:
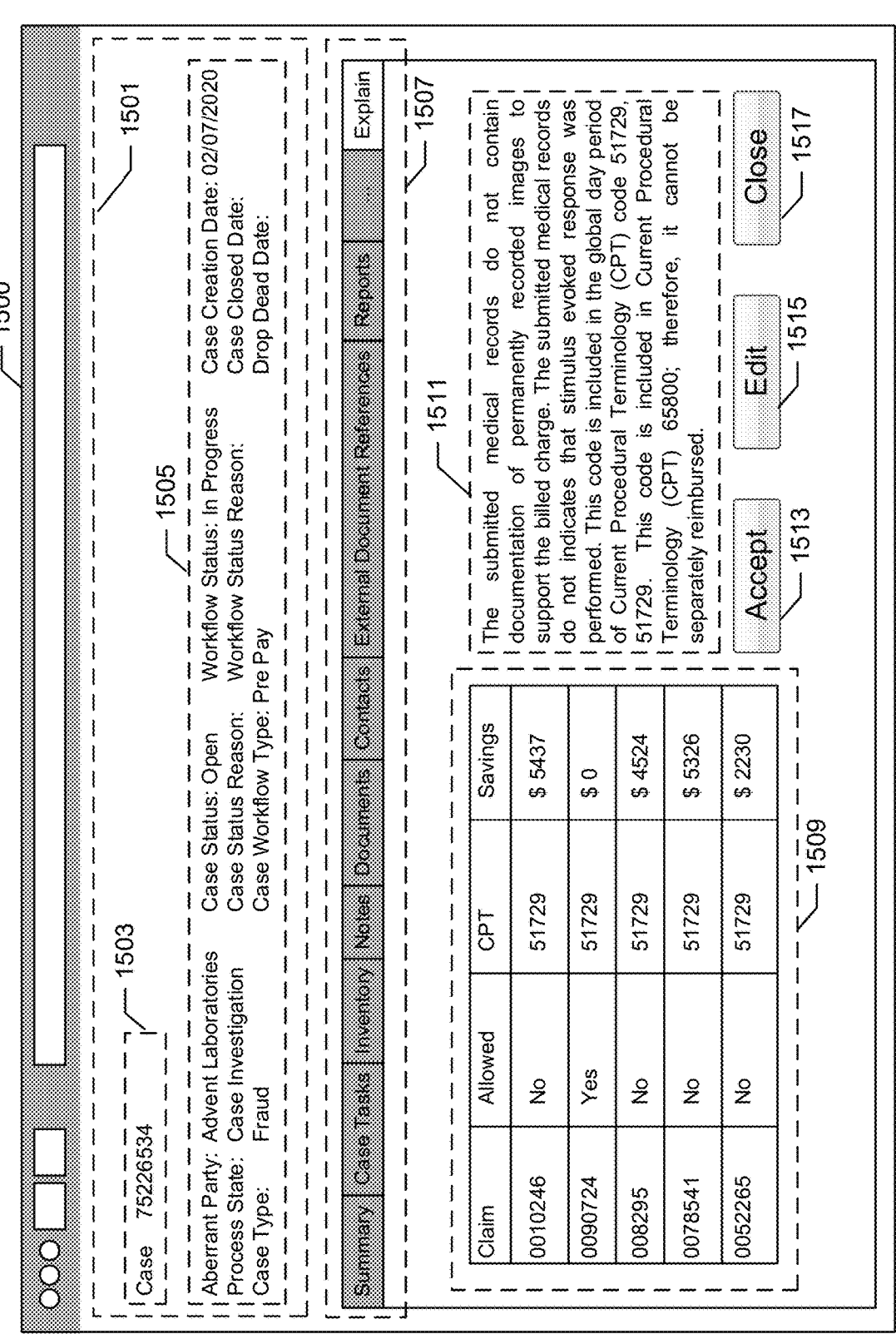

FIGS. 4, 5, 6, 7, 8, 9, 10, 11, 12, and 13 provide example flowcharts and diagrams illustrating example steps, processes, procedures, and/or operations associated with an example data object processing platform/system in accordance with various embodiments of the present disclosure; and FIG. 14 and FIG. 15 provide example views of example user interfaces in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

I. Computer Program Products, Methods, and Computing Entities

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
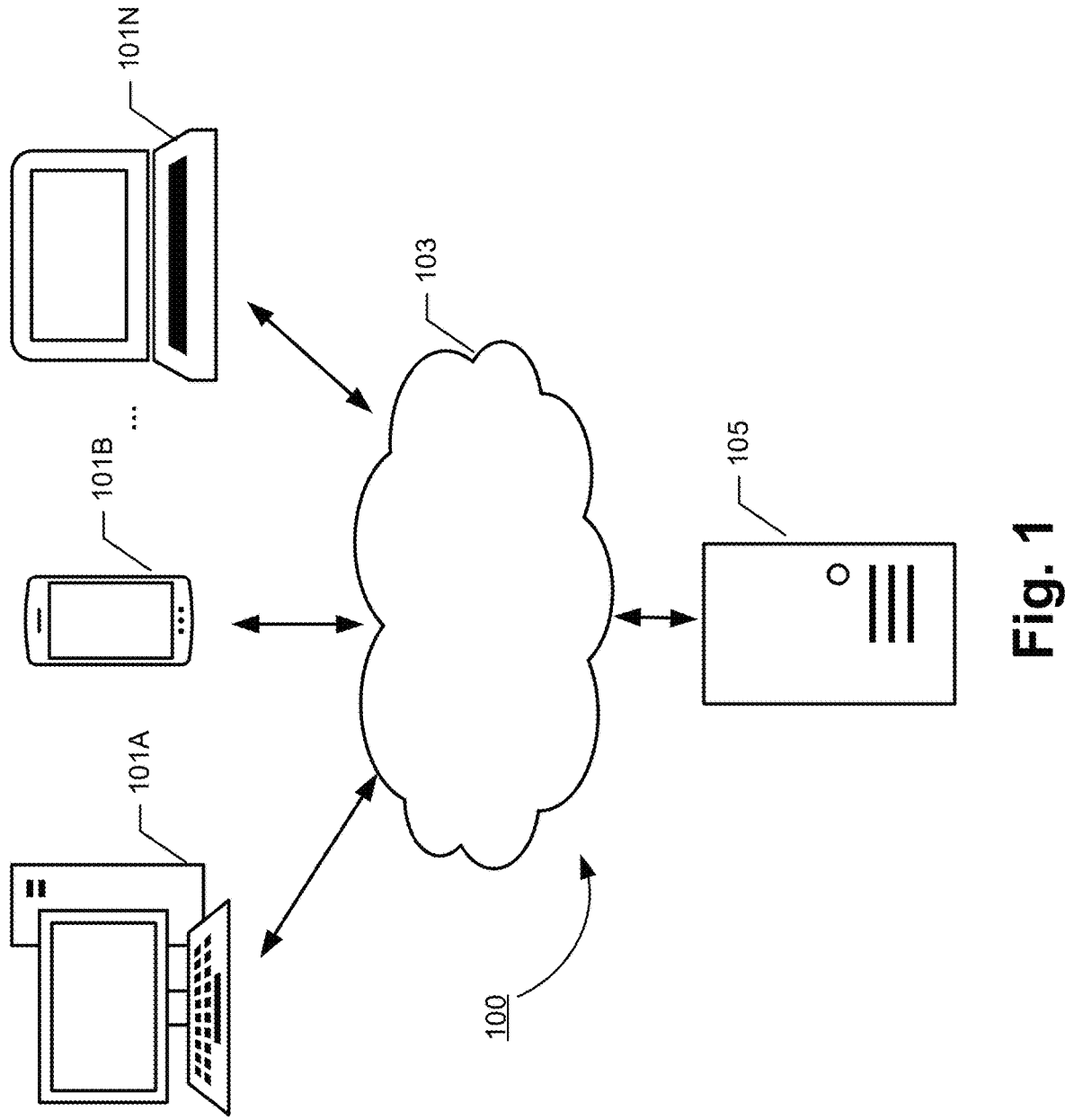
FIG. 1 is a diagram of an example data object processing platform/system that can be used in accordance with various embodiments of the present disclosure.

FIG. 1 provides an illustration of a data object processing platform/system 100 that can be used in conjunction with various embodiments of the present disclosure. As shown in FIG. 1, the data object processing platform/system 100 may comprise one or more data object computing entities 105, one or more user computing entities 101A, 101B, . . . 101N, and one or more networks 103. Each of the components of the data object processing platform/system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Data Object Computing Entity

Figure 2:
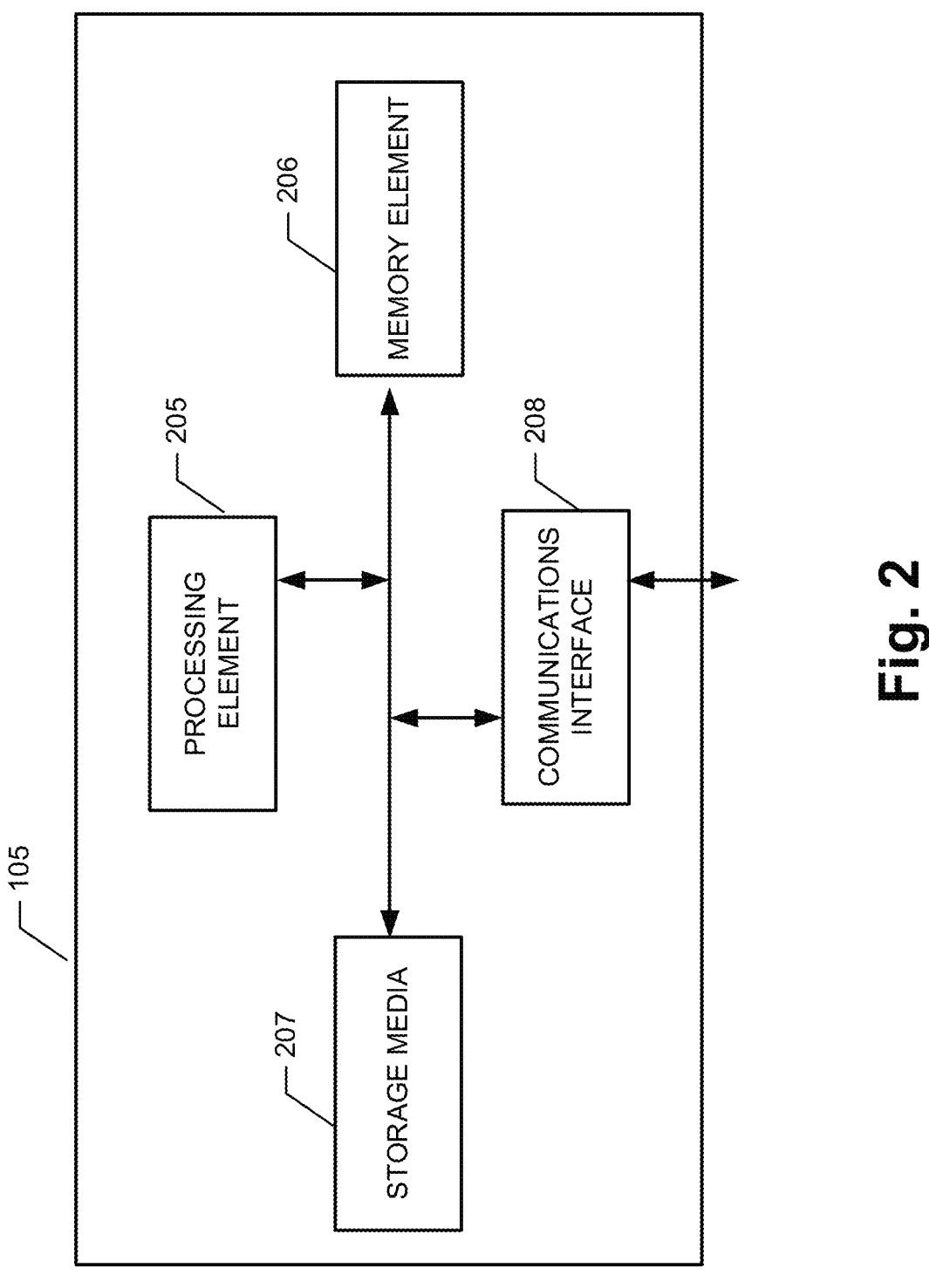
FIG. 2 is a schematic representation of an example data object computing entity in accordance with various embodiments of the present disclosure.

FIG. 2 provides a schematic of a data object computing entity 105 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the data object computing entity 105 may also include one or more network and/or communications interface 208 for communicating with various computing entities, such as by communicating data, content, information, and/or similar terms used herein that can be transmitted, received, operated on, processed, displayed, stored, and/or the like. For instance, the data object computing entity 105 may communicate with other data object computing entities 105, one or more user computing entities 101A-101N, and/or the like.

As shown in FIG. 2, in one embodiment, the data object computing entity 105 may include or be in communication with one or more processing elements (for example, processing element 205) (also referred to as processors, processing circuitry, and/or similar terms used herein interchangeably) that communicate with other elements within the data object computing entity 105 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the data object computing entity 105 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205 as shown in FIG. 2 and/or the processing element 308 as described in connection with FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the data object computing entity 105 with the assistance of the processing element 205 and operating system.

In one embodiment, the data object computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, obj ect code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored. Further, the information/data required for the operation of the recovery prediction system may also be partially stored in the cloud data storage system and partially stored in a locally maintained data storage system. More specifically, storage media 207 may encompass one or more data stores configured to store information/data usable in certain embodiments.

As indicated, in one embodiment, the data object computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. For instance, the data object computing entity 105 may communicate with computing entities or communication interfaces of other data object computing entities 105, user computing entities 101A-101N, and/or the like.

As indicated, in one embodiment, the data object computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data object computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The data object computing entity 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the data object computing entity's components may be located remotely from components of other data object computing entities 105, such as in a distributed system. Furthermore, one or more of the components may be aggregated and additional components performing functions described herein may be included in the data object computing entity 105. Thus, the data object computing entity 105 can be adapted to accommodate a variety of needs and circumstances.

b. Exemplary User Computing Entity

Figure 3:
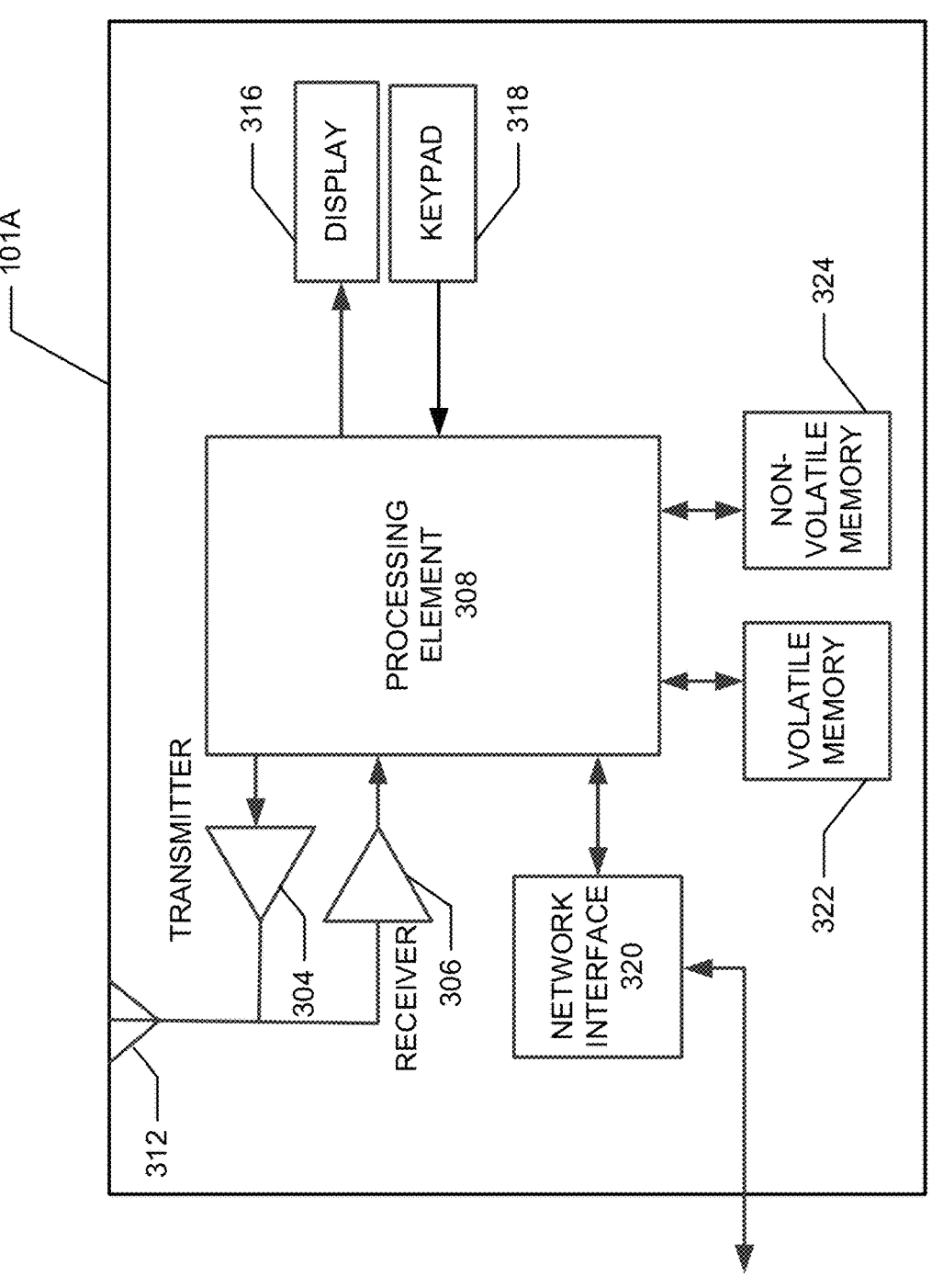
FIG. 3 is a schematic representation of an example user computing entity in accordance with various embodiments of the present disclosure.

FIG. 3 provides an illustrative schematic representative of one of the user computing entities 101A to 101N that can be used in conjunction with embodiments of the present disclosure. As will be recognized, the user computing entity may be operated by an agent and include components and features similar to those described in conjunction with the data object computing entity 105. Further, as shown in FIG. 3, the user computing entity may include additional components and features. For example, the user computing entity 101A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a data object computing entity 105, another user computing entity 101A, and/or the like. In this regard, the user computing entity 101A may be capable of operating with one or more air interface standards, communication protocols, modulation types, and access types. More particularly, the user computing entity 101A may comprise a network interface 320, and may operate in accordance with any of a number of wireless communication standards and protocols. In a particular embodiment, the user computing entity 101A may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The user computing entity 101A can also download changes, add-ons, and updates, for instance, to its firmware, software (e.g., including executable instructions, applications, program modules), and operating system.

According to one embodiment, the user computing entity 101A may include location determining aspects, devices, modules, functionalities, and/or similar words used herein interchangeably. For example, the user computing entity 101A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data may be determined by triangulating the position in connection with a variety of other systems, including cellular towers, Wi-Fi access points, and/or the like. Similarly, the user computing entity 101A may include indoor positioning aspects, such as a location module adapted to acquire, for example, latitude, longitude, altitude, geocode, course, direction, heading, speed, time, date, and/ or various other information/data. Some of the indoor aspects may use various position or location technologies including Radio-Frequency Identification (RFID) tags, indoor beacons or transmitters, Wi-Fi access points, cellular towers, nearby computing devices (e.g., smartphones, laptops) and/or the like. For instance, such technologies may include iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user computing entity 101A may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 101A to cause display or audible presentation of information/data and for user interaction therewith via one or more user input interfaces. The user output interface may be updated dynamically from communication with the data object computing entity 105. The user input interface can comprise any of a number of devices allowing the user computing entity 101A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 101A can collect information/data, user interaction/input, and/or the like.

The user computing entity 101A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entities 101A-101N.

c. Exemplary Networks

In one embodiment, the networks 103 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 103 may have any suitable communication range associated therewith and may include, for example, global networks (e.g., the Internet), MANs, WANs, LANs, or PANs. In addition, the networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 103 may utilize a variety of networking protocols including, but not limited to, TCP/IP based networking protocols. In some embodiments, the protocol is a custom protocol of JavaScript Object Notation (JSON) objects sent via a Websocket channel. In some embodiments, the protocol is JSON over RPC, JSON over REST/HTTP, and/or the like.

III. Exemplary Operation

Reference will now be made to FIGS. 4, 5, 6, 7, 8, 9, 10, 11, 12, and 13, which provide flowcharts and diagrams illustrating example steps, processes, procedures, and/or operations associated with a data object processing platform/system and/or a data object computing entity in accordance with various embodiments of the present disclosure. FIGS. 14 and 15 provide example views of interactive user interfaces in accordance with various embodiments of the present disclosure.

While example embodiments of the present disclosure may be described in the context of processing health insurance claims, as will be recognized, embodiments of the present disclosure are not limited to this context only.

a. Exemplary Generation of Summary Metadata

As described above, there are technical challenges, deficiencies and problems associated interpretability and explainability of outputs from artificial intelligence and machine learning algorithms and models. For example, a software black-box machine learning model may be implemented to process data associated with payment integrity waste & error (PI W&E) operations, and many technical challenges, deficiencies and problems exist in improving interpretability and explainability of outputs from the software black-box machine learning model.

In the present disclosure, the terms "software black-box machine learning model," "black-box model," "software black-box algorithm," "black-box algorithm," "black-box" and the like refer to an artificial intelligence algorithm/ model and/or a machine learning algorithm/model that generates one or more predictive outputs based at least in part on one or more predictive inputs without providing sufficient interpretability and/or explainability on the one or more outputs. A software black-box machine learning model may be viewed in terms of its inputs and outputs, without any knowledge of its internal operations or functions. For example, a software black-box machine learning model may include one or more operations or functions that may be too complicated to be understood or comprehended by some people, and the outputs may not be interpreted or explained by looking at the parameters associated with the operations or functions. Examples of software black-box machine learning models may include, but are not limited to, supervised machine learning models and/or deep learning models such as artificial neural networks (ANNs), deep neural networks (DNNs), and/or the like.

In the present disclosure, the terms "payment integrity waste & error" or "PI W&E" refer to data processing functions and operations associated with the identification of health insurance claims (also refer to as "claims" herein") that either contain procedures that are deemed unwarranted given the medical conditions and/or economic considerations involved (e.g. unnecessary procedures that may be referred to as "waste" or "W"), or procedures which have been coded incorrectly (e.g. mistakes on the claim that may be referred to as "error" or "E"). The term "health insurance claim" refers to data and/or information provided by a healthcare provider to a health insurance provider that includes a demand or request for payment or reimbursement associated with medical services.

As described above, a set of rules and one or more software black-box machine learning models may be used to identify claims which may contain W&E. Once the software black-box machine learning model identifies a claim as potentially containing W&E, the data processing on these claims may be stopped, and a medical record request associated with the claim may be placed. Once the medical record is received, the claim and medical record may be manually reviewed by a clinical reviewer to determine whether the claim, as coded, is supported by the medical record. If the claim, or part of the claim, is found to be unsupported, the full amount of the claim may not be paid (or may only be recovered in a post-pay scenario).

In order to provide technical improvements such as improving workflow efficiency and worker productivity, reducing unnecessary computer resource usage, and minimizing the time taken to review a claim, it is desirable for a computing system to indicate to the clinical reviewer why the claim has been flagged by the software black-box machine learning model. For example, it may reduce potential mistakes in processing the claims when the computing system indicates to the clinical reviewer what the clinical reviewer should look for when processing the claims, in addition to a probability that the claims may contain W&E.

Many solutions on improving interpretability and/or explainability face technical limitations and drawbacks. For example, approaches such as LIME (Local Interpretable Model-agnostic Explanations) and SHAP (SHapley Additive exPlanation) (and other similar methods) share several common drawbacks: the interpretability in these approaches speaks primarily to particular features of the claim at issue that drove the scoring associated with these approaches. As an illustrative example, the following three explanations might be given by these approaches in support of the identifying a claim as potentially containing W&E:

The claim has been flagged because it has CPT code 12345, and modifier 25 and the billing provider is in Arizona;

The claim has been flagged because this provider has a history of clinical denials and they submitted their claim in February; and The claim has been flagged because it has six claim lines, they have submitted more than 68 claims in last six months.

As illustrated in the above example, the primary drawback of these approaches to interpretability is that they are of little use to the clinical reviewer as these explanations do not inform them about what to actually look for in the claim—and do not help them interpret the medical record or contextualize the claim (for example, these approaches do not indicate or explain why Arizona is important in identifying the claim as potentially containing W&E in the above example).

Another approach of interpretability might be to build the model as a multi-class classifier, with target labels derived from more granular outcomes (e.g., upcoding of a particular current procedural terminology (CPT) code of the claims, etc.). However, this level of granularity may not exist in the target data.

Another approach to improve interpretability might be to avoid using software black-box machine learning models and instead use simpler interpretable models (such as decision trees). However, these simpler interpretable models may provide less precise predictions on potential W&E while still using similar approaches on interpretability as those described above.

To address these technical challenges, example embodiments of the present disclosure may generate data (for example, summary metadata as described herein) that may provide the reason(s) on why a given claim was flagged by a software black-box machine learning model and on the basis that there were similar claims in the training data objects that are used to train the software black-box machine learning model. As such, in various embodiments of the present disclosure, improvements on interpretability and explainability may be accomplished by at least identifying a set of claims in the training data objects that are highly similar to the flagged claim, and automatically summarize the findings of the past reviews on those similar claims, details of which are described herein.

By providing the clinical reviewer with these additional information (e.g., a set of similar claims from the training data objects and a summarization of the clinical reviewer's findings on those claims), various embodiments of the present disclosure may provide highly relevant information to the clinical reviewer to minimize the time taken to review the claim, and may therefore provide technical advantages such as improving workflow efficiency and reducing unnecessary computer resource usage (for example, reducing unnecessary computer resource consumption when the data processing system would stand idle while waiting for the output to be manually interpreted if various embodiments of the present disclosure are not implemented).

Figure 4:
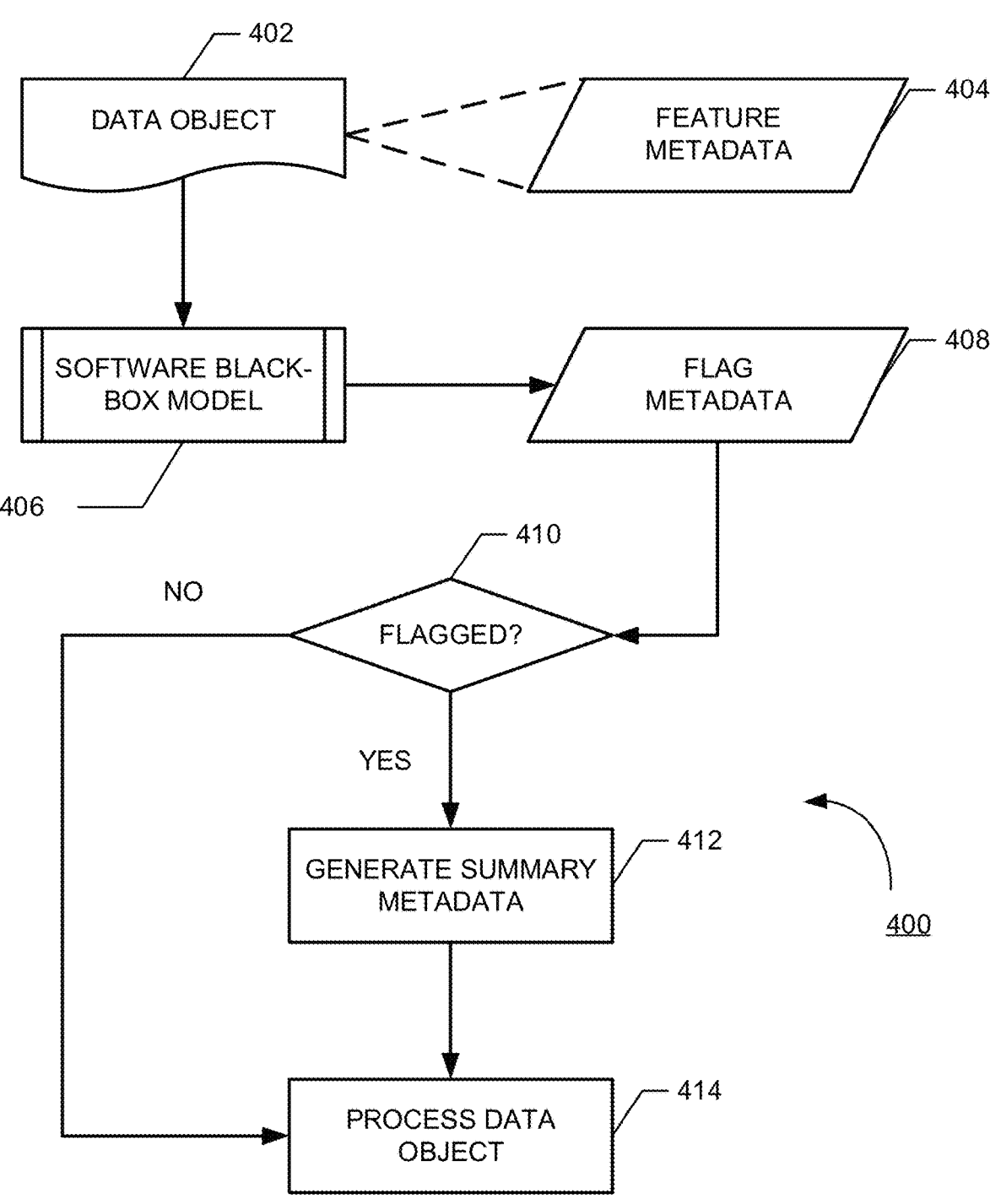

Referring now to FIG. 4, an example method 400 illustrates example generation of example summary metadata in accordance with embodiments of the present disclosure.

At step/operation 402, a computing entity (such as the data object computing entity 105 described above in connection with FIG. 1 and FIG. 2) may include means (such as the processing element 205 of the data object computing entity 105 described above in connection with FIG. 2) for receiving a data object.

In the present disclosure, the term "data object" refers to any data structure that represents one or more functionalities and/or characteristics associated with data and/or information. For example, a data object may be associated with a health insurance claim (also referred to as a "claim data object") that is associated with data and/or information related to a health insurance claim.

In some embodiments, a data object may be received by a data object computing entity. For example, the data object may be generated by a user computing entity and transmitted to the data object computing entity. In some embodiments, a data object may be generated by a data object computing entity (for example, based at least in part on one or more inputs received from a user computing entity).

In some embodiments, the data object may comprise one or more metadata. The term "metadata" refers to a parameter, a data field, a data element, or the like that describes an attribute of a data object.

For example, the data object may comprise one or more feature metadata (for example, the feature metadata associated with step/operation 404 shown in FIG. 4). The term "feature metadata" refers to a type of metadata that include one or more categorical and/or numeric type data associated with the data object. As an example, a claim data object (that is associated with a health insurance claim) may comprise categorical feature metadata such as, but not limited to, data and/or information related to current procedural terminology (CPT) code of the health insurance claim, diagnosis (or "Dx") associated with the health insurance claim, the modifier billed on the health insurance claim, the place of service associated with the health insurance claim, the gender of the patient associated with the health insurance claim, the billing party associated with the health insurance claim, the servicing party associated with the health insurance claim, the serving category associated with the health insurance claim, the billing category associated with the health insurance claim, the relative value unit(s) (RVU(s)) associated with the health insurance claim, the days between serving and billing associated with the health insurance claim, the day of the week when servicing the patient associated with the health insurance claim, the day of the week when billing the service associated with the health insurance claim, and/or the like.

While the description above provides an example of feature metadata associated with a data object that is a claim data object, it is noted that the scope of the present disclosure is not limited to the description above. In some embodiments, an example data object may comprise one or more additional and/or alternative feature metadata. For example, a data object in accordance with various embodiments of the present disclosure may not be a claim data object, and the feature metadata associated with the data object may not be related to some or all of the data/information described above.

Referring back to FIG. 4, subsequent to step/operation 402, the example method 400 proceeds to step/operation 406. At step/operation 406, a computing entity (such as the data object computing entity 105 described above in connection with FIG. 1 and FIG. 2) may include means (such as the processing element 205 of the data object computing entity 105 described above in connection with FIG. 2) for providing the data object to a software black-box machine learning model.

As defined above, the software black-box machine learning model may comprise one or more artificial intelligence algorithms/models and/or machine learning algorithms/ models that may generate one or more outputs based at least in part on one or more inputs. Such inputs and outputs may include, but not limited to metadata associated with a data object.

In the example shown in FIG. 4, the software black-box machine learning model may generate a flag metadata at step/operation 408 based at least in part on the data object received at step/operation 402. In some embodiments, the software black-box machine learning model may generate the flag metadata based at least in part on and/or via processing the feature metadata from step/operation 404 that is associated with the data object received at step/operation 402.

In the present disclosure, the term "flag metadata" refers to a type of metadata that may describe a predictive output for the data object. In some embodiments, the flag metadata (and the predictive output described by the flag metadata) may indicate or determine how the data object may be processed. For example, the flag metadata or the predictive output described by the flag metadata may provide basis for determining or selecting one or more workflows or routines for processing the data object. As a more specific example, workflows/routines such as payment initiation routines, payment denial routines, manual review routines (reviewing of the data object by a clinical reviewer) may be determined based at least in part on the flag metadata/predictive output described by the flag metadata. In some embodiments, the flag metadata may be generated based at least in part on the feature metadata associated with the data object. Additional details are described in connection with at least FIG. 4.

Continuing from the example above, the data object may be a claim data object associated with a health insurance claim. In such an example, the software black-box machine learning model may generate the flag metadata that indicates whether (or the probability) that the health insurance claim may contain W&E as part of the predictive output. For example, the flag metadata may be in the form of a TURE/ FALSE flag value. If the flag metadata indicates a TRUE flag value, the software black-box machine learning model has determined a predictive output that the health insurance claim may contain W&E. As described further in connection with at least FIG. 4, based at least in part on the flag metadata indicating a TRUE flag value, a payment denial routine or a manual review routine may be carried out, and a clinical reviewer may not initiate payment or may initiate a payment amount that is less than the requested payment amount in the health insurance claim. If the flag metadata indicates a FALSE flag value, the software black-box machine learning model has determined a predictive output that the health insurance claim may not contain W&E. As described further in connection with at least FIG. 4, based at least in part on the flag metadata indicating a FALSE flag value, a payment initiation routine may be carried out, and a clinical reviewer may initiate payment for the full requested payment amount in the health insurance claim or for an amount that is based at least in part on the corresponding insurance policy associated with the health insurance claim. Additionally, or alternatively, the flag metadata may be in the form of a percentage value that indicates the probability that the health insurance claim contains W&E.

In some embodiments, the software black-box machine learning model may be trained based at least in part on training data objects, details of which are described in connection with at least FIG. 6. In some embodiments, the data object received at step/operation 402 may not be part of the training data objects. For example, the data object may be a claim data object that represents a new or "live" health insurance claim. The software black-box machine learning model may generate the flag metadata for the claim data object based at least in part on the training using the training data objects.

For example, the software black-box machine learning model may include an example artificial neural network, such as a feedforward neural network. The example artificial neural network may include an interconnected group of nodes. Each node represents a mathematical function. The input to the mathematical function may include a set of input values and associated weights, and the mathematical function may map the inputs and weights to an output. The arrows connecting the nodes represent connections from the output of one node to the input of another node. Nodes may also be aggregated into layers. In this regard, different layers may perform different transformations of their corresponding inputs. The nodes, arrows, and/or layers of the example artificial neural network may be established through training using the training data objects.

While the description above provides an example of a software black-box machine learning model, it is noted that the scope of the present disclosure is not limited to the description above. In some examples, an example software black-box machine learning model may additionally and/or alternatively comprise one or more other models and/or algorithms.

Referring back to FIG. 4, subsequent to step/operation 408, the example method 400 proceeds to step/operation 410. At step/operation 410, a computing entity (such as the data object computing entity 105 described above in connection with FIG. 1 and FIG. 2) may include means (such as the processing element 205 of the data object computing entity 105 described above in connection with FIG. 2) for determining whether the flag metadata indicates that the data object is flagged.

As described above, the flag metadata may describe a predictive output for the data object. Continuing from the above claim data object example, the predictive output may indicate whether the claim contains (or is likely contain) W&E.

For example, if the flag metadata indicates a TRUE value, the flag metadata generated by the software black-box machine learning model describes a predictive output that the claim contains (or is likely to contain) W&E. If the flag metadata/predictive output indicates that the claim contains (or is likely to contain) W&E, the computing entity may determine that the claim data object is flagged at step/operation 410.

If the flag metadata indicates a FALSE value, the flag metadata generated by the software black-box machine learning model describes a predictive output that the claim does not contain (or is not likely to contain) W&E. If flag metadata/predictive output indicates that the claim does not contain (or is not likely to contain) W&E, the computing entity may determine that the claim data object is not flagged at step/operation 410.

If, at step/operation 410, the computing entity determines that the flag metadata indicates that the data object is flagged, the example method 400 proceeds to step/operation 412. At step/operation 412, a computing entity (such as the data object computing entity 105 described above in connection with FIG. 1 and FIG. 2) may include means (such as the processing element 205 of the data object computing entity 105 described above in connection with FIG. 2) for generating summary metadata.

In the present disclosure, the term "summary metadata" refers to a type of metadata that is associated with the outputs of a software black-box machine learning model. In some embodiments, the summary metadata may include text string(s), numerical character(s), alphabetical character(s), alphanumeric code(s), American Standard Code for Information Interchange (ASCII) character(s), and/or the like. In some embodiments, the summary metadata may contain data and/or information that may be generated based at least in part on note metadata associated with a subset of training data objects that is similar to the data object received at step/operation 402, details of which are described herein.

The summary metadata may contain a summarization of the clinical reviewer's findings on those training data objects, which may be relevant to the data object received at step/operation 402. As such, various embodiments of the present disclosure may improve the interpretability and/or explainability of outputs from the software black-box machine learning model. Example details of generating the summary metadata are described herein, including, but not limited to, those described in connection with at least FIG. 5-FIG. 15.

Referring back to FIG. 4, subsequent to step/operation 412, the example method 400 proceeds to step/operation 414. At step/operation 414, a computing entity (such as the data object computing entity 105 described above in connection with FIG. 1 and FIG. 2) may include means (such as the processing element 205 of the data object computing entity 105 described above in connection with FIG. 2) for processing data object.

In some embodiments, processing the data object at step/operation 414 may comprise causing the rendering of flag metadata generated at step/operation 408 and/or the summary metadata generated at step/operation 412 for display on a user computing entity (for example, the display 316 of the user computing entity 101A described above in connection with FIG. 3). Additionally, or alternatively, processing the data object at step/operation 414 may comprise receiving one or more user inputs.

Continuing from the above claim data object example, the computing entity may render both the flag metadata generated at step/operation 408 and the summary metadata generated at step/operation 412 for display on a user computing entity (for example, the display 316 of the user computing entity 101A described above in connection with FIG. 3). A user (for example, a clinical reviewer) may review the claim data object based at least in part on the summary metadata (and may additionally be based at least in part on, for example, data object corresponding to the medical record associated with the health insurance claim) to determine whether to initiate a payment on the health insurance claim. For example, if the clinical reviewer determines that there is W&E associated with the health insurance claim, the clinical reviewer may not initiate payment or may initiate a payment amount that is less than the requested payment amount in the health insurance claim. If the clinical reviewer determines that there is no W&E associated with the health insurance claim, the clinical reviewer may initiate payment for the full requested payment amount in the health insurance claim or for an amount that is based at least in part on the corresponding insurance policy associated with the health insurance claim.

While the description above provides an example of a clinical reviewer, it is noted that the scope of the present disclosure is not limited to the description above. For example, in some embodiments, the computing entity (such as the data object computing entity 105 described above in connection with FIG. 1 and FIG. 2) may programmatically determine whether to initiate payment and/or the payment amount. For example, if the computing entity determines that there is W&E associated with the health insurance claim based at least in part on the summary metadata generated at step/operation 412, the computing entity may not initiate payment or may initiate a payment amount that is less than the requested payment amount in the health insurance claim. If the computing entity determines that there is no W&E associated with the health insurance claim based at least in part on the summary metadata generated at step/operation 412, the computing entity may initiate payment for the full requested payment amount in the health insurance claim or for an amount that is based at least in part on the insurance policy.

Referring back to step/operation 410, if the computing entity determines that the flag metadata indicates that the data object is not flagged, the example method 400 proceeds to step/operation 414. As described above, at step/operation 414, a computing entity (such as the data object computing entity 105 described above in connection with FIG. 1 and FIG. 2) may include means (such as the processing element 205 of the data object computing entity 105 described above in connection with FIG. 2) for process data object.

In some embodiments, the computing entity may process the data object at step/operation 414 similar to those described above. For example, the computing entity may cause the rendering of the flag metadata generated at step/operation 408 for display on a user computing entity (for example, the display 316 of the user computing entity 101A described above in connection with FIG. 3). Additionally, or alternatively, processing the data object at step/operation 414 may comprise receiving one or more user inputs.

Continuing from the above example, a clinical reviewer may determine that there is no W&E associated with the health insurance claim, and the clinical reviewer may initiate payment for the full requested payment amount in the health insurance claim or for an amount that is based at least in part on the insurance policy. Additionally, or alternatively, the computing entity may determine that there is no W&E associated with the health insurance claim based at least in part on the summary metadata generated at step/operation 412, and the computing entity may initiate payment for the full requested payment amount in the health insurance claim or for an amount that is based at least in part on the insurance policy.

Figure 5:
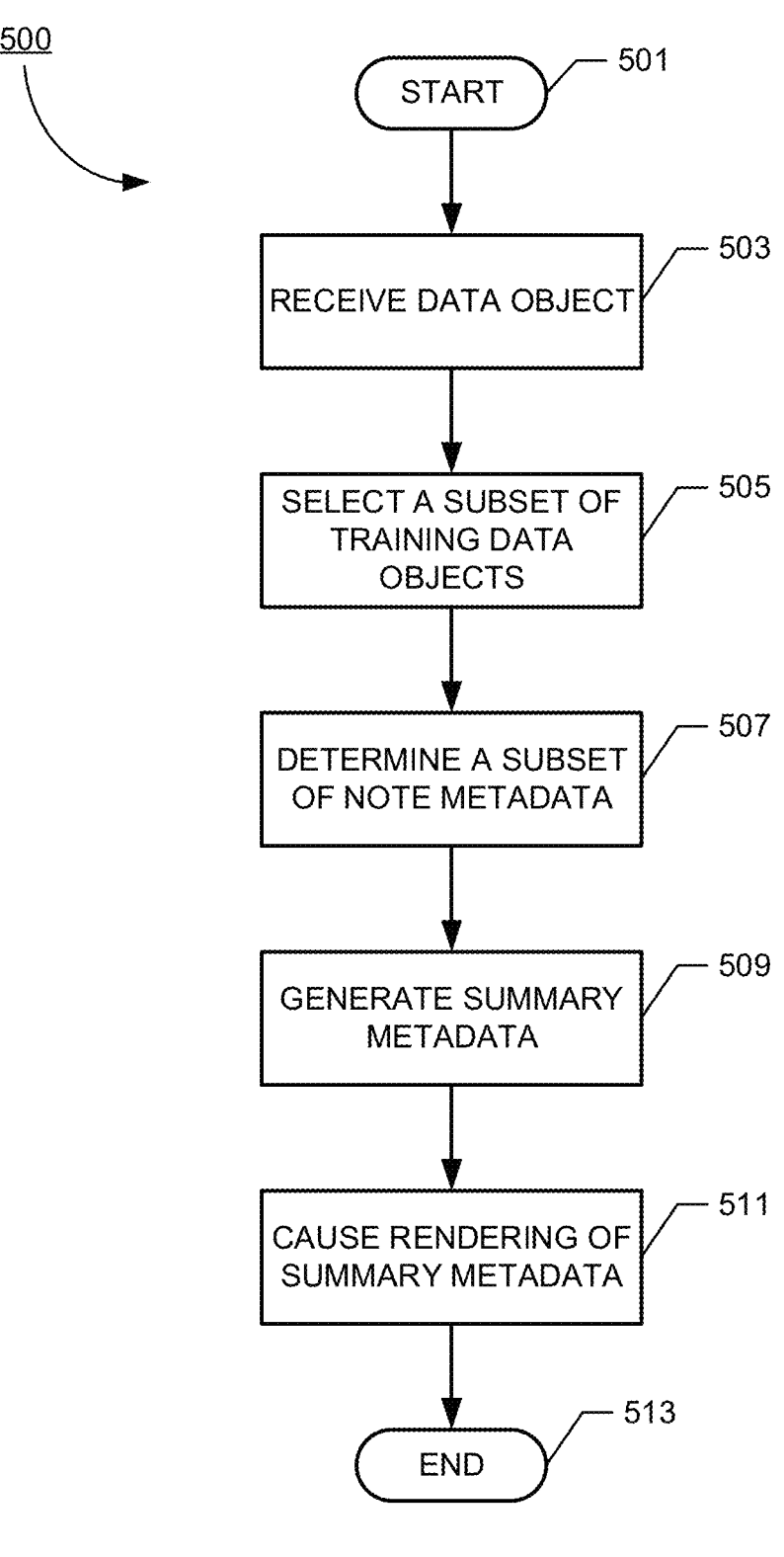

Referring now to FIG. 5, an example method 500 illustrates example generation of example summary metadata in accordance with embodiments of the present disclosure. In some embodiments, the example method 500 described in connection with FIG. 5 may comprise one or more steps for generating the summary metadata at step/operation 412 of FIG. 4.

The example method 500 starts at step/operation 501.

At step/operation 503, a computing entity (such as the data object computing entity 105 described above in connection with FIG. 1 and FIG. 2) may include means (such as the processing element 205 of the data object computing entity 105 described above in connection with FIG. 2) for receiving a data object.

In some embodiments, the computing entity may receive a data object that comprises feature metadata and flag metadata. In some embodiments, the flag metadata may be generated by at least a software black-box machine learning model.

For example, the data object may be a claim data object, which may comprise feature metadata that may be in the form of categorical feature metadata and related to a health insurance claim, similar to those described in connection with at least step/operation 404 of FIG. 4. Additionally, or alternatively, a software black-box machine learning model may generate the flag metadata based at least in part on the feature metadata associated with the claim data object, similar to those described above in connection with step/operation 408 of FIG. 4.

Referring back to FIG. 5, subsequent to step/operation 503, the example method 500 proceeds to step/operation 505. At step/operation 505, a computing entity (such as the data object computing entity 105 described above in connection with FIG. 1 and FIG. 2) may include means (such as the processing element 205 of the data object computing entity 105 described above in connection with FIG. 2) for selecting a subset of training data objects.

In the present disclosure, the term "training data object" refers to a data object that may be used to train artificial intelligence and/or machine learning models, including but not limited to, software black-box machine learning models as described above. For example, through training, an example software black-box machine learning model may adjust its functions and/or operations based at least in part on the training data objects, such that the software black-box machine learning model may generate an output based at least in part on an input and in accordance with data/information inferred from the training data objects. Additional details associated with training the software black-box machine learning model are described further herein, including, but not limited to, those described in connection with at least FIG. 6.

In some embodiments, the subset of training data objects may be selected from a plurality of training data objects associated with the software black-box machine learning model based at least in part on the feature metadata associated with the data object received at step/operation 503. For example, the training data objects in the subset may be similar to the data object received at step/operation 503. Additional details associated with selecting the subset of training data objects are described further herein, including, but not limited to, those described in connection with at least FIG. 7-FIG. 11. For example, the computing entity may select the subset of training data objects from a plurality of training data objects by mapping the data object into a multi-dimensional mapping space that comprises mappings of the plurality of training data objects, details of which are described in connection with at least FIG. 7-FIG. 11.

Continuing from the claim data object above, at step/operation 505, the computing entity may select a subset of training data objects from a plurality of training data objects (that may be based at least in part on past claim data objects representing health insurance claims that have been processed), and the plurality of the training data objects are used to train the software black-box machine learning model. For example, the training data objects in the subset may be similar to the claim data object received at step/operation 503.

Referring back to FIG. 5, subsequent to step/operation 505, the example method 500 proceeds to step/operation 507. At step/operation 507, a computing entity (such as the data object computing entity 105 described above in connection with FIG. 1 and FIG. 2) may include means (such as the processing element 205 of the data object computing entity 105 described above in connection with FIG. 2) for determining a subset of note metadata.

In the present disclosure, the term "note metadata" refers to a type of metadata that is generated based at least in part on a user input (for example, an input from a clinical reviewer) and describe one or more contents of a data object. For example, the note metadata may describe cause, reason, and/or basis associated with the processing of the data object. As a more particular example, the note metadata may comprise notes from a clinical review that provide reason(s) for approving and/or denying payment for the health insurance claim represented by the claim data object or the training data object. In some embodiments, the note metadata may include text string(s), numerical character(s), alphabetical character(s), alphanumeric code(s), ASCII character(s), and/or the like.

Continuing from the claim data object example above, each training data object may correspond to one or more note metadata, which may provide note and/or description associated with the processing of training data objects. As an example, each training data object may be based at least in part on a past claim data object representing a health insurance claim that has been processed by a clinical reviewer. The note metadata may be generated (for example, based at least in part on user input and by the computing entity), and may include a clinical reviewer's written findings on the claims describing cause, reason, and/or basis for approving/rejecting the claims. For example, the note metadata may include one finding for each line of the health insurance claim, and each finding may indicate whether the line of the health insurance claim is supported or unsupported by the medical record associated with the health insurance claim. If one or more lines of the health insurance claim is not supported by the medical record, the clinical reviewer may determine that the health insurance claim may contain W&E.

In some embodiments, the computing entity may determine a subset of note metadata from a plurality of note metadata. In some embodiments, the plurality of note metadata may be stored in a database that is separated from the database storing the training data objects. In such examples, the computing entity may retrieve the subset of note metadata corresponding to the subset of the training data objects based at least in part on, for example, identifiers associated with the subset of the training data objects.

In some embodiments, the computing entity may determine the subset of note metadata corresponding to the subset of training data objects that are selected at step/operation 505. Continuing from the claim data object example above, the training data objects in the subset may be similar to the claim data object received at step/operation 503, and the subset of note metadata associated with subset of the training data objects may include descriptions of findings associated with the subset of training data objects as provided a clinical reviewer.

Additional details associated with determining a subset of note metadata are described further herein, including, but not limited to, those described in connection with at least FIG. 6 and FIG. 12-FIG. 13.

Referring back to FIG. 5, subsequent to step/operation 507, the example method 500 proceeds to step/operation 509. At step/operation 509, a computing entity (such as the data object computing entity 105 described above in connection with FIG. 1 and FIG. 2) may include means (such as the processing element 205 of the data object computing entity 105 described above in connection with FIG. 2) for generating summary metadata.

In some embodiments, the computing entity may generate the summary metadata based at least in part on the subset of note metadata determined at step/operation 507. Continuing from the claim data object example above, the subset of note metadata may include written findings associated with the subset of training data objects (that are similar to the claim data object) and provided by a clinical reviewer. In this example, the computing entity may generate the summary metadata based at least in part on these written findings. Additional details associated with generating summary metadata are described further herein, including, but not limited to, those described in connection with at least FIG. 12-FIG. 13. For example, the computing entity may generate the summary metadata based at least in part on a plurality of word scores associated with the subset of note metadata, details of which are described in connection with at least FIG. 12-FIG. 13.

Referring back to FIG. 5, subsequent to step/operation 509, the example method 500 proceeds to step/operation 511. At step/operation 511, a computing entity (such as the data object computing entity 105 described above in connection with FIG. 1 and FIG. 2) may include means (such as the processing element 205 of the data object computing entity 105 described above in connection with FIG. 2) for causing rendering of the summary metadata.

In some embodiments, the computing entity may cause rendering of the summary metadata on a user computing entity. For example, the computing entity may cause the rendering of the summary metadata for display on a display of the user computing entity (for example, the display 316 of the user computing entity 101A described above in connection with FIG. 3). Example interactive interfaces associated with the rendering of the summary metadata are illustrated and described in connection with at least FIG. 14 and FIG. 15.

In some embodiments, the data object may be processed based at least on the summary metadata and/or the rendering of the summary metadata, such as, but not limited to, those described above in connection with at least step/operation 414 of FIG. 4 above.

Referring to FIG. 5, subsequent to step/operation 511, the example method 500 ends at step/operation 513.

b. Exemplary Identification of Similar Training Data Objects

In various embodiments of the present disclosure, a computing entity (such as the data object computing entity 105 described above in connection with FIG. 1 and FIG. 2) may implement various processing techniques (including, but not limited to, one or more encoding and/or embedding techniques) to select a subset of training data objects (for example, in connection with step/operation 505 of FIG. 5 described above) that may be similar to the data object received by the computing entity. Referring now to FIG. 5-FIG. 11, various examples associated with the identifying similar training data objects are illustrated.

Figure 6:
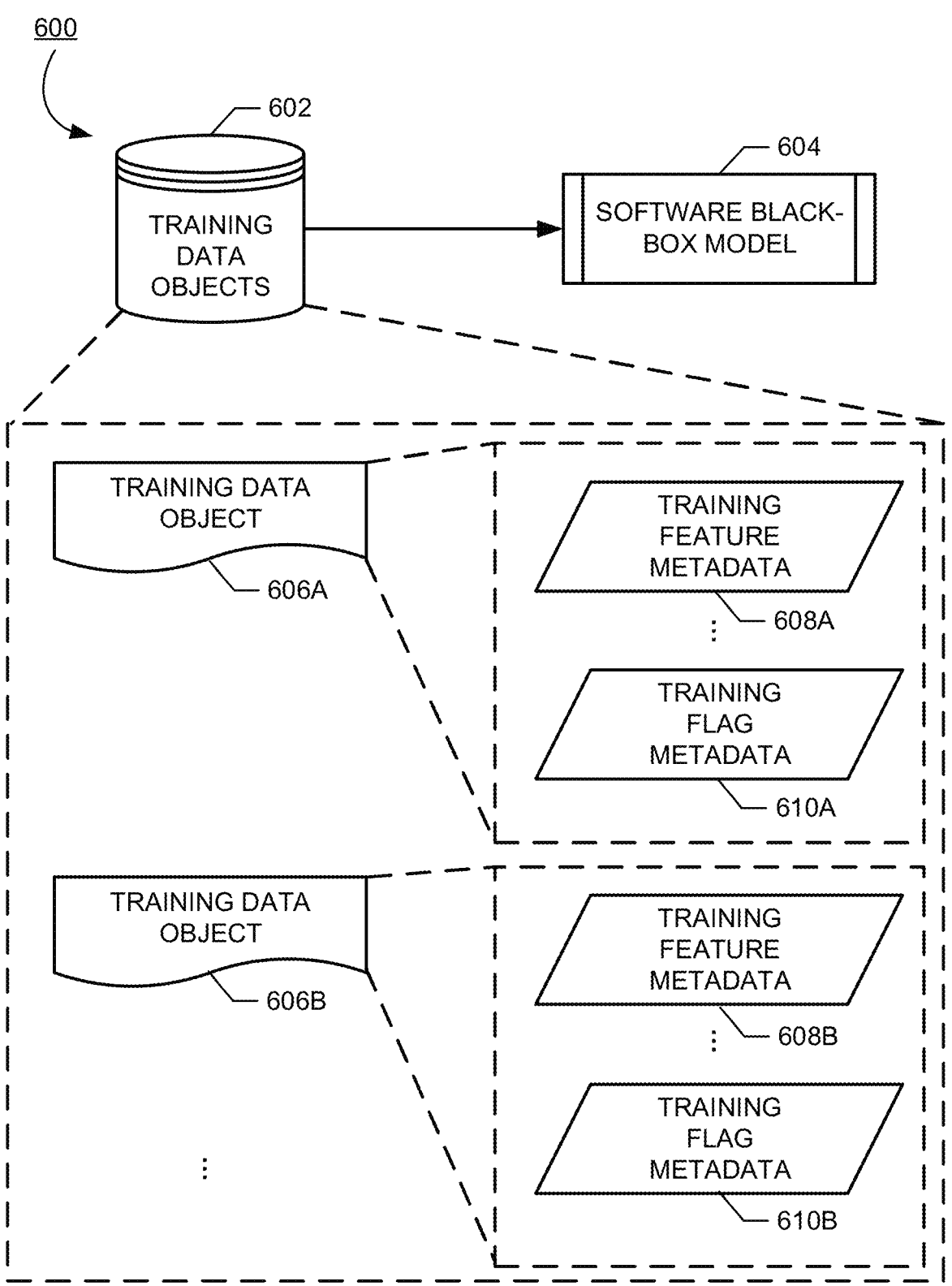

Referring now to FIG. 6, an example method 600 illustrates example training of the software black-box machine learning model 604 based at least in part on training data objects 602.

As described above, the software black-box machine learning model may be trained based at least in part on the plurality of training data objects. In the example illustrated in FIG. 6, the training data objects 602 may be stored in a database. In some embodiments, the database may be internal to the data object processing platform/system 100 and/or the data object computing entity 105 described above in connection with at least FIG. 1. For example, the training data objects may be stored in the storage media 207 of the data object computing entity 105 illustrated in connection with FIG. 2. In some embodiments, the database may be external to the data object processing platform/system 100 and/or the data object computing entity 105 described above in connection with at least FIG. 1. For example, the training data objects may be stored in a data storage media that is external to the data object computing entity 105, and the data object computing entity 105 may retrieve training data objects from the database through the one or more networks 103 illustrated in FIG. 1.

In the example shown in FIG. 6, each of the training data objects may comprise training feature metadata and/or training flag metadata, and/or may include additional metadata. For example, the training data object 606A may include training feature metadata 608A and training flag metadata 610A. The training data object 606B may include training feature metadata 608B and training flag metadata 610B.

In the present disclosure, the term "training feature metadata" refers to a type of metadata that includes one or more categorical and/or numeric type data associated with a training data object. For example, each training data object may be a past claim data object representing a health insurance claim that has been processed by a clinical reviewer. In this example, the training feature metadata may comprise categorical feature metadata such as, but not limited to, data and/or information related to CPT code of the health insurance claim, diagnosis associated with the health insurance claim, the modifier billed on the health insurance claim, the place of service associated with the health insurance claim, the gender of the patient associated with the health insurance claim, the billing party associated with the health insurance claim, the servicing party associated with the health insurance claim, the serving category associated with the health insurance claim, the billing category associated with the health insurance claim, the RVU(s) associated with the health insurance claim, the days between serving and billing associated with the health insurance claim, the day of the week when servicing the patient associated with the health insurance claim, the day of the week when billing the service associated with the health insurance claim, and/or the like.

In the present disclosure, the term "training flag metadata" refers to a type of flag metadata that is associated with a training data object. For example, the training flag metadata may indicate or determine how the data object has been processed (for example, by a clinical reviewer and/or by a computing entity). For example, the training flag metadata may be in the form of a TURE/FALSE flag value. If the training flag metadata indicates a TRUE flag value, a clinical reviewer and/or a computing entity has determined that the health insurance claim may contain W&E. If the flag metadata indicates a FALSE flag value, a clinical reviewer and/or a computing entity has determined that the health insurance claim may not contain W&E. Additionally, or alternatively, the flag metadata may be in the form of a percentage value that indicates the probability that the health insurance claim may contain W&E as determined by the clinical reviewer and/or the computing entity.

In the example shown in FIG. 6, the software black-box machine learning model 604 may be trained based at least in part on the training feature metadata (such as training feature metadata 608A and training feature metadata 608B) and their corresponding training flag metadata (such as training flag metadata 610A and training flag metadata 610B, respectively), so that the software black-box machine learning model 604 may generate flag metadata for a new data object.

For example, the software black-box machine learning model 604 may generate one or more inferences on data connections between the training feature metadata and the training flag metadata, and may utilize the inferences to generate flag metadata for the new data object, similar to those described above in connection with at least FIG. 4 and FIG. 5. For example, the training flag metadata may indicate that there is suspected W&E based at least in part on the training feature metadata (for example, the training flag metadata may indicate a TRUE value). Accordingly, the software black-box machine learning model 604 may generate one or more inferences on data connections between the training feature metadata with a TRUE value for a flag metadata. When the software black-box machine learning model 604 receives a data object having feature metadata that is similar to the training feature metadata, the software black-box machine learning model 604 may generate a flag metadata indicating a TRUE value. Additionally, or alternatively, the training flag metadata may indicate that there is no W&E based at least in part on the training feature metadata (for example, the training flag metadata may indicate a FALSE value). Accordingly, the software black-box machine learning model 604 may generate one or more inferences on data connections between the training feature metadata with a FALSE value for a flag metadata. When the software black-box machine learning model 604 receives a data object having feature metadata that is similar to the training feature metadata, the software black-box machine learning model 604 may generate a flag metadata indicating a FALSE value.

As described above, one or more note metadata may be associated with each of the training data objects 602. Continuing from the example above, the one or more note metadata may provide a clinical reviewer's written findings on the health insurance claims associated with the training data objects describing cause, reason, and/or basis for approving/rejecting such claims.

In some embodiments, the note metadata may be stored in a database. In some embodiments, the database may be external to database storing the training data objects. For example, the note metadata may be stored in non-transitory computer-readable storage media that are separate from the data storage device storing the training data objects, and the data object computing entity 105 may retrieve note metadata and training data objects separately through the one or more networks 103 illustrated in FIG. 1. In some embodiments, the database storing note metadata may be internal to database storing the training data objects. For example, a data storage device may store both the note metadata and the training data objects.

Figure 7:
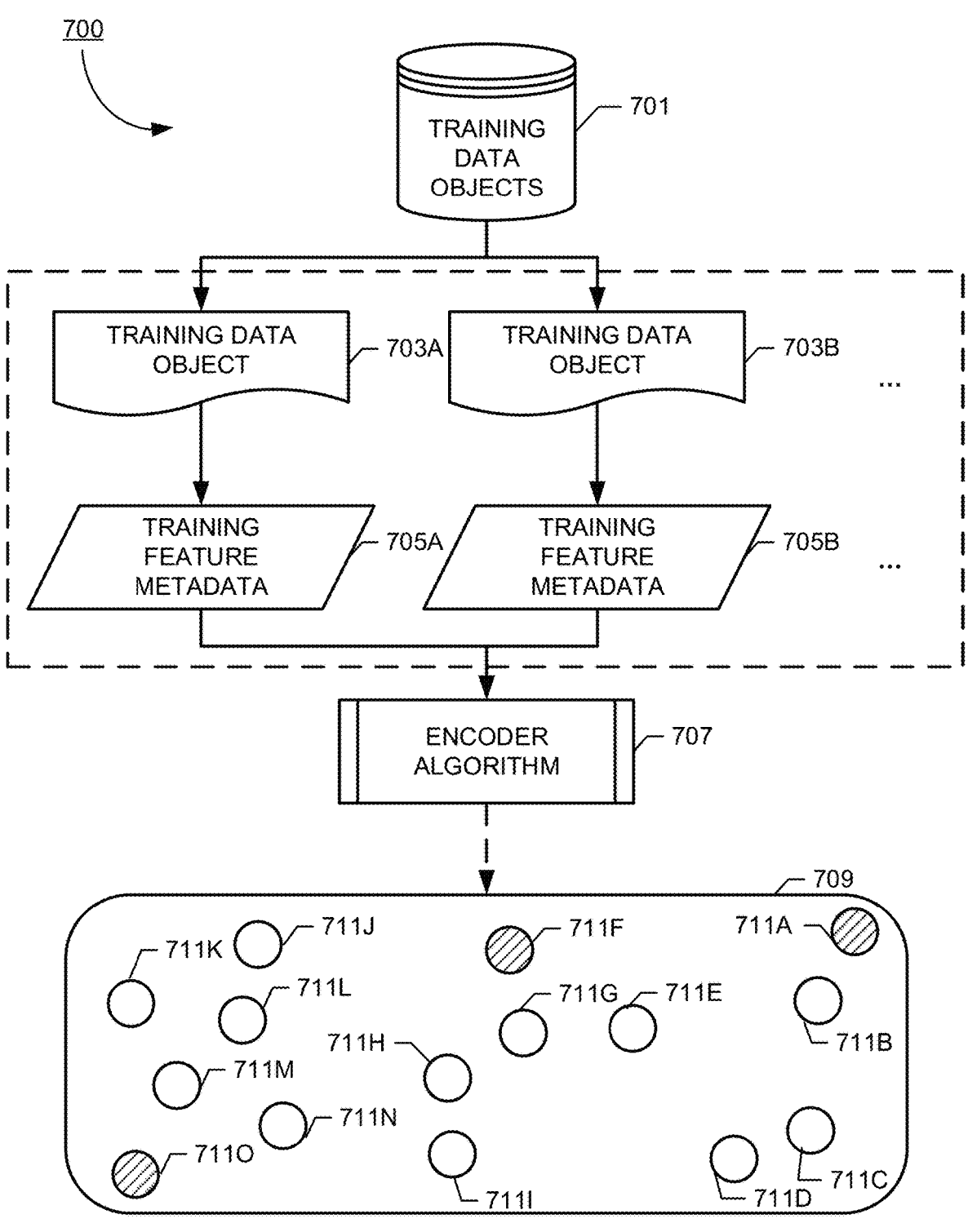

Referring now to FIG. 7, an example method 700 illustrates example operations associated with generation of example summary metadata in accordance with embodiments of the present disclosure. In particular, FIG. 7 illustrates example operations associated with encoding a plurality of training feature metadata to a plurality of training numerical features based at least in part on an encoder algorithm.

In the example shown in FIG. 7, a computing entity (such as the data object computing entity 105 described above in connection with FIG. 1 and FIG. 2) may include means (such as the processing element 205 of the data object computing entity 105 described above in connection with FIG. 2) for retrieving a plurality of training data objects 701.

In some embodiments, the training data objects may have been used to train a software black-box machine learning model, similar to those described above in connection with at least FIG. 6. In some embodiments, the same software black-box machine learning model may generate flag metadata for a data object, similar to those described in connection with at least FIG. 4 and FIG. 5. In some embodiments, the training data objects may be retrieved from a database that is internal or external to the computing entity, similar to those described above in connection with at least FIG. 6. In some embodiments, each training data object may be based at least in part on a past claim data object representing a health insurance claim that has been processed by a clinical reviewer, similar to those described above.

In the example shown in FIG. 7, the training data objects 701 may include training data object 703A and training data object 703B. The training data object 703A may comprise training feature metadata 705A, and the training data object 703B may comprise training feature metadata 705B, similar to those described above in connection with at least FIG. 6.

While the description above provides an example associated with two training data objects (training data object 703A and training data object 703B), it is noted that the scope of the present disclosure is not limited to the description above. For example, in accordance with various embodiments of the present disclosure, less than two or more than two training data objects may be used in association with various example methods (for example, in association with the example method 700 described and illustrated in connection with FIG. 7).

In some embodiments, the computing entity may retrieve a plurality of training feature metadata corresponding to the plurality of training data objects. Continuing from the example shown in FIG. 7, the computing entity may retrieve training feature metadata 705A corresponding to the training data object 703A, and may retrieve training feature metadata 705B corresponding to the training data object 703B.

In some embodiments, subsequent to retrieving the plurality of training feature metadata, a computing entity (such as the data object computing entity 105 described above in connection with FIG. 1 and FIG. 2) may include means (such as the processing element 205 of the data object computing entity 105 described above in connection with FIG. 2) for encoding the plurality of training feature metadata to a plurality of training numerical features based at least in part on an encoder algorithm.

In the present disclosure, the term "numerical feature" refers to data/information of a data object that is represented, processed, transmitted, and/or stored in a numerical structure, form, and/or format. For example, each numerical feature may be generated based at least in part on the feature metadata of a data object, details of which are described herein. Each numerical feature may associate with one or more coordinates, and each of the one or more coordinates may designate a location in a dimension. As such, numerical features may be represented in a multi-dimensional mapping space (also referred to as a "mapping space" or a "feature space") that comprises multiple dimensions based at least in part on their corresponding coordinates. The multi-dimensional mapping space may comprise mappings of the plurality of training data objects.

The term "training numerical feature" refers to data/information of a training data object that is represented, processed, transmitted, and/or stored in a numerical structure, form, and/or format. Similarly, a training numerical feature may be represented in a multi-dimensional mapping space that comprises multiple dimensions. For example, a training numerical feature may be positioned in the multi-dimensional mapping space based at least in part on their corresponding coordinates. As such, data objects may be mapped into the multi-dimensional mapping space through the training numerical features, and the multi-dimensional mapping space may comprise mappings of the plurality of training data objects.

As described above, training feature metadata (for example, the training feature metadata 705A and/or the training feature metadata 705B) may include one or more categorical type data that are not numerical in nature. In such embodiments, the computing entity may encode the training feature metadata to training numerical features through encoding and/or embedding based at least in part on an encoder algorithm/technique and/or embedder algorithm/technique. For example, the encoder algorithm/technique and/or embedder algorithm/technique may determine the coordinates for each training numerical feature based at least in part on their corresponding categorical type data from the training feature metadata.

For example, the encoder algorithm may be associated with a CatBoost encoder. In such an example, the computing entity may encode the training feature metadata and transform them into training numerical features. The training numerical features may be represented in an Euclidean space.

In the example shown in FIG. 7, the computing entity may encode the training feature metadata using the encoder algorithm 707, which may transform the training feature metadata into numerical features that may be represented in the multi-dimensional mapping space 709. In the example shown in FIG. 7, the training numerical features in the multi-dimensional mapping space 709 may include training numerical feature 711A, training numerical feature 711B, training numerical feature 711C, training numerical feature 711D, training numerical feature 711E, training numerical feature 711F, training numerical feature 711G, training numerical feature 711H, training numerical feature 711I, training numerical feature 711J, training numerical feature 711K, training numerical feature 711L, training numerical feature 711M, training numerical feature 711N, and training numerical feature 711O. As described above, the location of each training numerical feature in the multi-dimensional mapping space may be determined based at least in part on the coordinates associated with the training numerical feature. The multi-dimensional mapping space 709 may comprise mappings of the plurality of training data objects that are in the form of training numerical features (for example, training numerical features 711A-711O).

While the description above provides an example of using CatBoost encoder to transform training feature metadata into training numerical features in an Euclidean space, it is noted that the scope of the present disclosure is not limited to the description above. In some examples, an example computing entity may implement one or more additional and/or alternative encoder algorithm/technique and/or embedder algorithm/technique, and the numerical features may be represented in other types of multi-dimensional mapping spaces.

Figure 8:
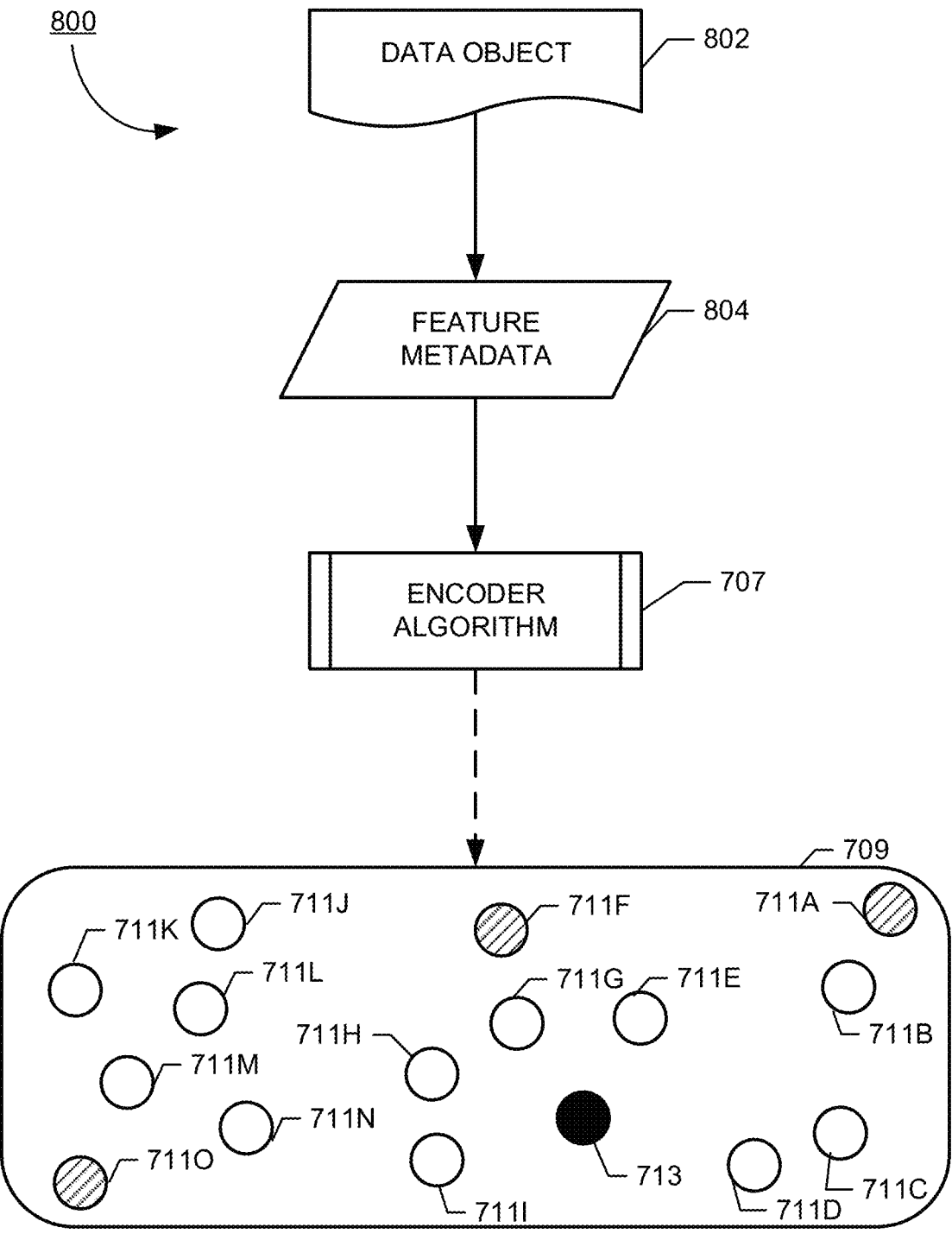

Referring now to FIG. 8, an example method 800 illustrates example operations associated with generation of example summary metadata in accordance with embodiments of the present disclosure. In particular, FIG. 8 illustrates example operations associated with encoding a feature metadata of a data object to a numerical feature based at least in part on the encoder algorithm.

In the example shown in FIG. 8, a computing entity (such as the data object computing entity 105 described above in connection with FIG. 1 and FIG. 2) may include means (such as the processing element 205 of the data object computing entity 105 described above in connection with FIG. 2) for receiving a data object 802.

In some embodiments, the data object 802 may comprise claim feature metadata, similar to those described above in connection with at least FIG. 4 and FIG. 5. For example, the data object may be a claim data object, which may comprise feature metadata that may be in the form of categorical feature metadata and may be related to a health insurance claim, similar to those described in connection with at least step/operation 404 of FIG. 4.

In some embodiments, a software black-box machine learning model (for example, the same software black-box machine learning model that has been trained using the training data objects 701 described above in connection with FIG. 7) may generate the flag metadata for the data object 802. Continuing from the claim data object example above, the flag metadata may indicate that the health insurance claim corresponding to the claim data object may contain W&E.

In the example shown in FIG. 8, the data object 802 may comprise feature metadata 804. A computing entity (such as the data object computing entity 105 described above in connection with FIG. 1 and FIG. 2) may include means (such as the processing element 205 of the data object computing entity 105 described above in connection with FIG. 2) for encoding the feature metadata to a numerical feature.

In some embodiments, the computing entity may encode the feature metadata 804 to a numerical feature through encoding and/or embedding based at least in part on an encoder algorithm/technique and/or embedder algorithm/technique, similar to those described above in connection with FIG. 7. For example, the encoder algorithm/technique and/or embedder algorithm/technique may determine the coordinates for the numerical feature based at least in part on its corresponding categorical type data from the feature metadata of the data object.

For example, the encoder algorithm may be associated with a CatBoost encoder. In such an example, the computing entity may encode the feature metadata and transform it into a numerical feature. The numerical feature may be represented in an Euclidean space.

In the example shown in FIG. 8, the computing entity may use the encoder algorithm 707 for encoding the feature metadata 804, and the same encoder algorithm 707 is used to encode training feature metadata as described above in connection with FIG. 7. As such, the feature metadata 804 may be encoded to a numerical feature 713 that is in the same multi-dimensional mapping space 709 as the training numerical features generated in accordance with the example method 700 (including, but not limited to, training numerical feature 711A, training numerical feature 711B, training numerical feature 711C, training numerical feature 711D, training numerical feature 711E, training numerical feature 711F, training numerical feature 711G, training numerical feature 711H, training numerical feature 711I, training numerical feature 711J, training numerical feature 711K, training numerical feature 711L, training numerical feature 711M, training numerical feature 711N, and training numerical feature 711O).

Figure 9:
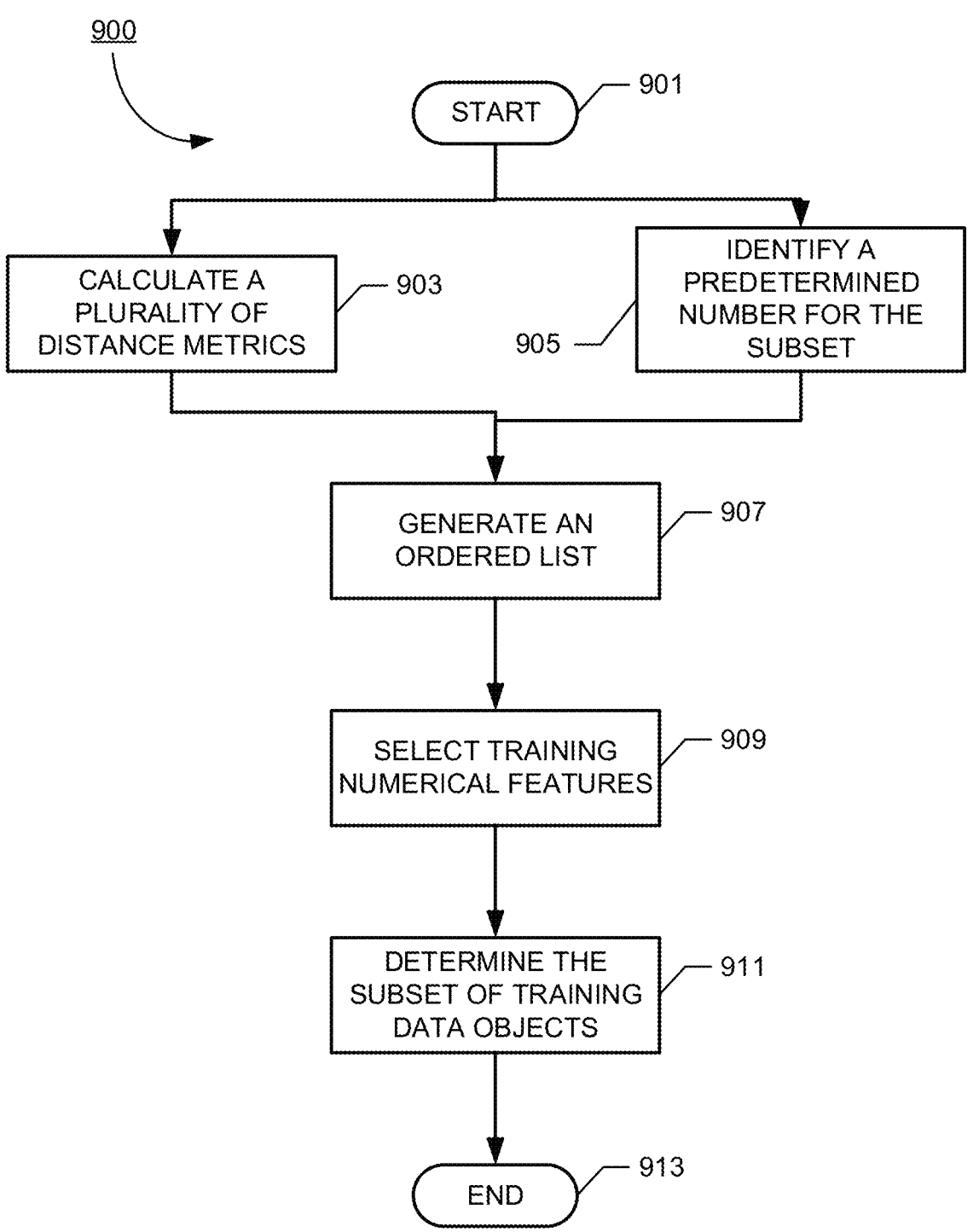

Referring now to FIG. 9, an example method 900 illustrates example operations associated with generation of example summary metadata in accordance with embodiments of the present disclosure. In particular, FIG. 9 illustrates example operations associated with determining/selecting a subset of training data objects (for example, in connection with step/operation 505 of FIG. 5 described above) that may be similar to the data object received by the computing entity.

The example method 900 starts at step/operation 901.

At step/operation 903, a computing entity (such as the data object computing entity 105 described above in connection with FIG. 1 and FIG. 2) may include means (such as the processing element 205 of the data object computing entity 105 described above in connection with FIG. 2) for calculating a plurality of distance metrics. For example, the computing entity may include means for calculating, based at least in part on the multi-dimensional mapping space, a plurality of distance metrics between the numerical feature for the data object and each of the plurality of training numerical features.

In some embodiments, the example method 900 may continue from the example method 700 described above in connection with FIG. 7 and the example method 800 described above in connection with FIG. 8. For example, each of the plurality of distance metrics may indicate/correspond to a distance between the numerical feature (generated based at least in part on the data object as described above in connection with FIG. 8) and each of the plurality of training numerical features (generated based at least in part on the training data objects as described above in connection with FIG. 7). In some embodiments, the computing entity may select the subset of training data objects based at least in part on the plurality of distance metrics.

Figure 10:
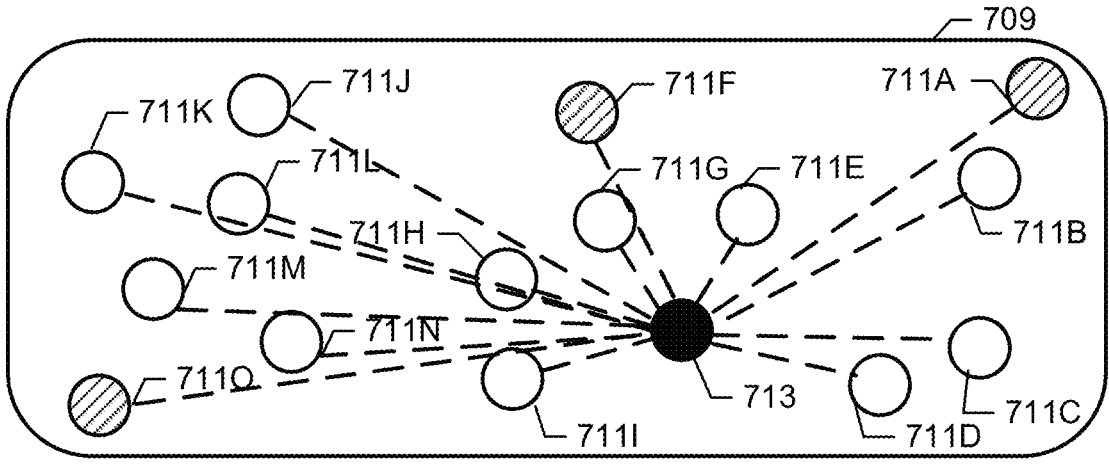

For example, referring to FIG. 10, the example multi-dimensional mapping space 709 that includes the numerical feature 713 for the data object and the training numerical features 711A-711O is shown. The computing entity may calculate a plurality of distance metrics that indicate/correspond to a distance (shown in dashed lines in FIG. 10) between the numerical feature 713 and each of the plurality of training numerical features 711A-711O. For example, the computing entity may calculate a distance metric that indicates/corresponds to a distance between the numerical feature 713 and the training numerical features 711A. The computing entity may calculate a distance metric that indicates/corresponds to a distance between the numerical feature 713 and the training numerical features 711B. The computing entity may calculate a distance metric that indicates/corresponds to a distance between the numerical feature 713 and the training numerical features 711C. The computing entity may calculate a distance metric that indicates/corresponds to a distance between the numerical feature 713 and the training numerical features 711D. The computing entity may calculate a distance metric that indicates/corresponds to a distance between the numerical feature 713 and the training numerical features 711E. The computing entity may calculate a distance metric that indicates/corresponds to a distance between the numerical feature 713 and the training numerical features 711F. The computing entity may calculate a distance metric that indicates/corresponds to a distance between the numerical feature 713 and the training numerical features 711G. The computing entity may calculate a distance metric that indicates/corresponds to a distance between the numerical feature 713 and the training numerical features 711H. The computing entity may calculate a distance metric that indicates/corresponds to a distance between the numerical feature 713 and the training numerical features 711I. The computing entity may calculate a distance metric that indicates/corresponds to a distance between the numerical feature 713 and the training numerical features 711J. The computing entity may calculate a distance metric that indicates/corresponds to a distance between the numerical feature 713 and the training numerical features 711K. The computing entity may calculate a distance metric that indicates/corresponds to a distance between the numerical feature 713 and the training numerical features 711L. The computing entity may calculate a distance metric that indicates/corresponds to a distance between the numerical feature 713 and the training numerical features 711M. The computing entity may calculate a distance metric that indicates/corresponds to a distance between the numerical feature 713 and the training numerical features 711N. The computing entity may calculate a distance metric that indicates/corresponds to a distance between the numerical feature 713 and the training numerical features 711O.

In various embodiments of the present disclosure, the computing entity may generate the plurality of distance metrics based at least in part on one or more types of distance formulas. For example, the computing entity may generate the plurality of distance metrics using Euclidean formula. Additionally, or alternatively, the computing entity may generate the plurality of distance metrics using distance formulas such as, but not limited to, Cosine, Mahalanobis, Minkowski, and/or the like.

Referring back to FIG. 9, at step/operation 905, a computing entity (such as the data object computing entity 105 described above in connection with FIG. 1 and FIG. 2) may include means (such as the processing element 205 of the data object computing entity 105 described above in connection with FIG. 2) for setting or identifying a predetermined number for the subset of the training data objects.

In the present disclosure, the predetermined number for the subset of the training data objects refers to a number or amount of the training data objects in the subset. In some embodiments, the predetermined number may be set or identified by the computing entity based at least in part on feedback data associated with the data object processing platform/system. For example, the data object processing platform/system may receive feedback data based at least in part on user input that indicates a desired amount or number for the subset of the training data objects.

In some embodiments, the predetermined number for the subset of the training data objects may be set or identified as five. In such embodiments, the subset of the training data objects may include five training data objects. In some embodiments, the predetermined number may be of other values.

In some embodiments, the step/operation 905 may be performed prior to the step/operation 903. In some embodiments, the step/operation 905 may be performed subsequent to the step/operation 903. In some embodiments, the step/operation 905 may be performed at the same time with the step/operation 903.

Subsequent to step/operation 903 and/or step/operation 905, the example method 900 proceeds to step/operation 907. At step/operation 907, a computing entity (such as the data object computing entity 105 described above in connection with FIG. 1 and FIG. 2) may include means (such as the processing element 205 of the data object computing entity 105 described above in connection with FIG. 2) for generating an ordered list of the plurality of training numerical features.

In some embodiments, the ordered list of the plurality of training numerical features may be based at least in part on their corresponding distance metrics. For example, the computing entity may arrange each training numerical feature based at least in part on its distance to the numerical feature in the multi-dimensional mapping space. In such an example, the ordered list of the plurality of training numerical features may represent training numerical features from closest (e.g. the distance metric indicates/corresponds to a shortest distance) to the farthest (e.g. the distance metric indicates/corresponds to a longest distance) to the numerical feature.

For example, referring to FIG. 10, the computing entity may generate an ordered list of training numerical features 711A-711O based at least in part on its distance to the numerical feature 713 (e.g. as indicated by the distance metrics).

Referring back to FIG. 9, subsequent to step/operation 907, the example method 900 proceeds to step/operation 909. At step/operation 909, a computing entity (such as the data object computing entity 105 described above in connection with FIG. 1 and FIG. 2) may include means (such as the processing element 205 of the data object computing entity 105 described above in connection with FIG. 2) for selecting training numerical features.

In some embodiments, the computing entity may select a subset of training numerical features from the ordered list based at least in part on the predetermined number. Continuing from the example above, the predetermined number of training numerical features may be five, and the computing entity may select the top five training numerical features from the ordered list. In other words, the computing entity may select the five training numerical features that are closest to the numerical feature.

Figure 11:
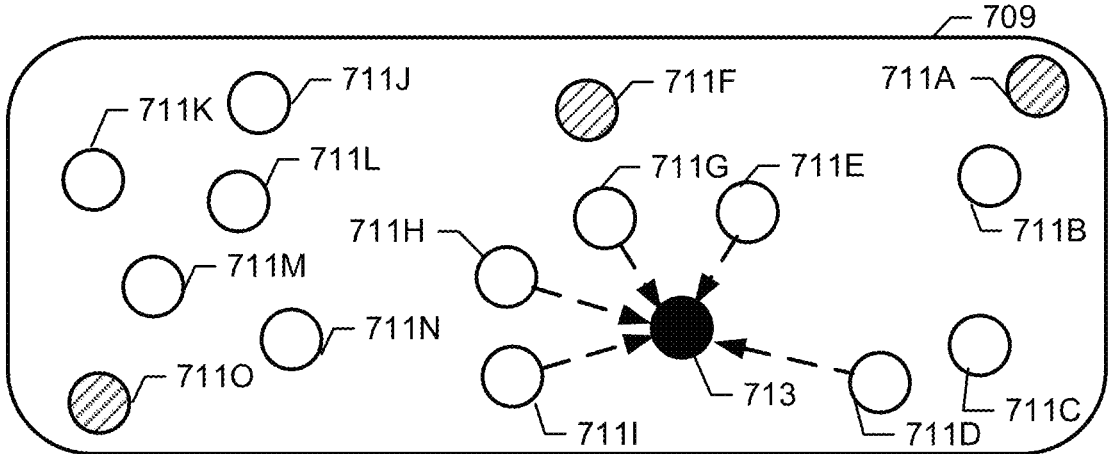

For example, referring to FIG. 11, the computing entity may select the top five training numerical features that are closeted to the numerical feature 713 (for example, training numerical feature 711G, training numerical feature 711E, training numerical feature 711H, training numerical feature 711I, and training numerical feature 711D).

Referring back to FIG. 9, subsequent to step/operation 909, the example method 900 proceeds to step/operation 911. At step/operation 911, a computing entity (such as the data object computing entity 105 described above in connection with FIG. 1 and FIG. 2) may include means (such as the processing element 205 of the data object computing entity 105 described above in connection with FIG. 2) for determining the subset of training data objects.

In some embodiments, the computing entity may determine the subset of training data objects corresponding to the subset of training numerical features selected at step/operation 909.

As described above, the subset of training numerical features may be selected based at least in part on the corresponding distance metrics. In other words, the training numerical features in the subset may be closest to the numerical feature of the data object. As such, the subset of training data objects corresponding to the subset of training numerical features (e.g. the feature metadata of which were encoded into the subset of training numerical features) may represent those training data objects that are similar to the data object.

Continuing from the claim data object example above, the subset of training data objects may represent past health insurance claims that are similar to the health insurance claim represented by the data object. As such, the example method 900 (in connection with other example methods described in the present disclosure) illustrates example operations for identifying training data objects that are similar to the received data object.

Subsequent to step/operation 911, the example method 900 ends at step/operation 913.

c. Exemplary Summarization of Note Metadata

In various embodiments of the present disclosure, a computing entity (such as the data object computing entity 105 described above in connection with FIG. 1 and FIG. 2) may implement various processing techniques (including, but not limited to, one or more natural language processing techniques) to generate summary metadata based at least in part on a subset of note metadata corresponding to the subset of training data objects (for example, those selected based at least in part on the example methods described in connection with at least FIG. 5-FIG. 11). Referring now to FIG. 12-FIG. 13, various examples associated with summarizing note metadata are illustrated.

Referring now to FIG. 12, an example method 1200 illustrates example operations associated with generating example summary metadata in accordance with embodiments of the present disclosure.

The example method 1200 starts at step/operation 1202.

As described above, a computing entity (such as the data object computing entity 105 described above in connection with FIG. 1 and FIG. 2) may include means (such as the processing element 205 of the data object computing entity 105 described above in connection with FIG. 2) for selecting a subset of training data objects based at least in part on a new data object received by the computing entity (for example, based at least in part on the example methods described in connection with at least FIG. 5-FIG. 11). In some embodiments, the computing entity may retrieve a subset of note metadata that correspond to the subset of training data objects (for example, based at least in part on the example method described in connection with at least FIG. 5 and FIG. 6).

At step/operation 1204, a computing entity (such as the data object computing entity 105 described above in connection with FIG. 1 and FIG. 2) may include means (such as the processing element 205 of the data object computing entity 105 described above in connection with FIG. 2) for computing a plurality of word scores.

In some embodiments, the computing entity may calculate or compute the plurality of word scores based at least in part on the subset of note metadata. For example, the computing entity may implement one or more natural language processing techniques/algorithms, including, but not limited to, an inverse document frequency (IDF) based algorithm. As an example, an IDF based algorithm may be implemented through the term frequency-inverse domain frequency technique (TF-IDF) technique, such as, but not limited to, using Sklearn's TF-IDF Transformer functionalities (it is noted that the scope of the present disclosure is not limited to this implementation only). In such an example, each of the plurality of word scores may be associated with an IDF value, which may represent a numerical statistic that indicates how important a word is in the note metadata.

In some embodiments, a word score for a word may be calculated based at least in part on one note metadata from the subset of note metadata. In some embodiments, a word score for a word may be calculated based at least in part on the entire corpus of the subset of note metadata.

Continuing from the example above in connection with FIG. 11, the computing entity may select a subset of training numerical features that include training numerical feature 711D, training numerical feature 711E, training numerical feature 711G, training numerical feature 711H, and training numerical feature 711I. The note metadata corresponding to the training data object associated with the training numerical feature 711D may include the following: RAM0010246170:

1. Not supported. The submitted medical records do not contain sufficient detail to support the billed Current Procedural Terminology (CPT) code 76942. In addition, this code is included in Current Procedural Terminology (CPT) code 76872. The appropriate use of the 59 modifier cannot be determined without documentation.

2. Supported.

3. Not supported. The submitted medical records do not contain documentation of permanently recorded images to support the billed charge.

4. Not supported. The submitted medical records do not contain sufficient detail to support the billed Current Procedural Terminology (CPT) code 76942. In addition, this code is included in Current Procedural Terminology (CPT) code 76872. The appropriate use of the 59 modifier cannot be determined without documentation. In addition, the submitted medical records do not contain documentation of permanently recorded images to support the billed charge.

Continuing from the example above, the note metadata corresponding to the training data object associated with the training numerical feature 711E may include the following: VRG0090724190:

1. Not supported. The submitted medical records do not contain documentation of the localization process and documentation of permanently recorded images to support the billed charge.

2. Supported.

Continuing from the example above, the note metadata corresponding to the training data object associated with the training numerical feature 711G may include the following: VRGOO82956689:

1. Not supported. The submitted medical records do not contain documentation of permanently recorded images to support the billed charge.

. Supported.

Continuing from the example above, the note metadata corresponding to the training data object associated with the training numerical feature 711H may include the following: FLA0078541689:

1. Supported.

2. Not supported. This code is included in Current Procedural Terminology (CPT) code 76872; therefore, it cannot be separately reimbursed. The medical records received do not support that the procedure or service was distinct or independent from other services performed; therefore, the use of the 59 modifier is not supported. In addition, the submitted medical records do not contain documentation of permanently recorded images.

3. Current Procedure Terminology (CPT) code 76942 59 (1 Unit) remains not supported. The submitted medical records do not contain documentation of the permanently recorded images to support the billed charge.

4. Not supported. The submitted medical records do not contain documentation of the permanently recorded images to support the billed charge.

5. Not supported. The submitted medical records do not contain documentation of permanently recorded images to support the billed charge. Therefore, the billed Current procedural Terminology (CPT) code and modifier cannot be verified.

Continuing from the example above, the note metadata corresponding to the training data object associated with the training numerical feature 711I may include the following: GSO0052265928:

1. Supported.

In this example, the computing entity may calculate the plurality of word scores for these words in the note metadata:

```
{'25': 1.4054651081081644,
 '30117': 2.09861228866811,
 '30140': 2.09861228866811,
 '31231': 2.09861228866811,
 '51729': 2.09861228866811,
 '51792': 2.09861228866811,
 '59': 2.09861228866811,
 '65800': 2.09861228866811,
```

-continued

```
'76942': 2.09861228866811,
'90': 2.09861228866811,
'99213': 2.09861228866811,
'accuracy': 2.09861228866811,
'anterior': 2.09861228866811,
'appeal': 2.09861228866811,
...}
```

While the description above provides an example of calculating word scores based at least in part on IDF values, it is noted that the scope of the present disclosure is not limited to the description above. In some examples, an example computing entity may implement one or more additional and/or alternative techniques for calculating word scores, such as, but not limited to, Bidirectional Encoder Representations (BERT), Word2Vec, and/or the like.

Referring back to FIG. 12, at step/operation 1206, a computing entity (such as the data object computing entity 105 described above in connection with FIG. 1 and FIG. 2) may include means (such as the processing element 205 of the data object computing entity 105 described above in connection with FIG. 2) for generating sentence structures.

In some embodiments, the computing entity may generate a plurality of sentence structures based at least in part on the subset of note metadata. For example, the computing entity may implement one or more natural language processing techniques/algorithms, including, but not limited to, sentence tokenization techniques. Such sentence tokenization techniques may split text from the subset of note metadata into individual sentences (i.e. individual sentence structures). Example sentence tokenization techniques may include, but not limited to, punctuation-based tokenization (for example, splitting the text into sentences based at least in part on the punctuation mark period "." in the text).

While the description above provides an example technique of generating sentence structures, it is noted that the scope of the present disclosure is not limited to the description above. In some examples, an example method may comprise one or more additional and/or alternative techniques/algorithms to generate sentence structures based at least in part on the subset of note metadata.

In some embodiments, the step/operation 1206 may be performed prior to the step/operation 1204. In some embodiments, the step/operation 1206 may be performed subsequent to the step/operation 1204. In some embodiments, the step/operation 1206 may be performed at the same time with the step/operation 1204.

Subsequent to step/operation 1204 and/or step/operation 1206, the example method 1200 proceeds to step/operation 1208. At step/operation 1208, a computing entity (such as the data object computing entity 105 described above in connection with FIG. 1 and FIG. 2) may include means (such as the processing element 205 of the data object computing entity 105 described above in connection with FIG. 2) for calculating a plurality of sentence scores corresponding to the plurality of sentence structures generated at step/operation 1206.

In some embodiments, the computing entity may calculate the plurality of sentence scores corresponding to the plurality of sentence structures based at least in part on the plurality of word scores calculated at step/operation 1204. For example, each sentence score may be calculated based at least in part on a sum of word scores associated with words in the sentence structure.

While the description above provides an example of calculating sentence scores, it is noted that the scope of the present disclosure is not limited to the description above. In some examples, an example method may comprise one or more additional and/or alternative techniques/algorithms to calculate sentence scores.

Subsequent to step/operation 1208, the example method 1200 proceeds to step/operation 1210. At step/operation 1210, a computing entity (such as the data object computing entity 105 described above in connection with FIG. 1 and FIG. 2) may include means (such as the processing element 205 of the data object computing entity 105 described above in connection with FIG. 2) for selecting a subset of sentence structures.

In some embodiments, the computing entity may select a subset of sentence structures from the plurality of sentence structures based at least in part on the plurality of sentence scores.

For example, the computing entity may select the subset of sentence structures that have sentence score(s) within the top N (for example, top 5) among the plurality of sentence scores calculated at step/operation 1208. Additional details of selecting a subset of sentence structures are described in connection with at least FIG. 13.

Subsequent to step/operation 1210, the example method 1200 proceeds to step/operation 1212. At step/operation 1212, a computing entity (such as the data object computing entity 105 described above in connection with FIG. 1 and FIG. 2) may include means (such as the processing element 205 of the data object computing entity 105 described above in connection with FIG. 2) for generating the summary metadata.

In some embodiments, the computing entity may generate the summary metadata based at least in part on the sentence structures in the subset of sentence structures selected at step/operation 1210. For example, the summary metadata may combine the sentence structures that are selected at step/operation 1210.

Continuing from the example above, the summary metadata may comprise the following:

> Summary="'The submitted medical records do not contain documentation of permanently recorded images to support the billed charge. The submitted medical records do not indicate that stimulus evoked response was performed. This code is included in the global day period of Current Procedural Terminology (CPT) code 51729,51792. This code is included in Current Procedural Terminology (CPT) 65800; therefore, it cannot be separately reimbursed."

In the example shown above, the summary metadata indicates that the claim data object is flagged by the software black-box machine learning model because the medical record submitted/CPT used do not adhere with the CMS rules.

Subsequent to step/operation 1212, the example method 1200 ends at step/operation 1214.

Referring now to FIG. 13, an example method 1300 illustrates example operations associated with generating example summary metadata in accordance with embodiments of the present disclosure. In particular, FIG. 13 illustrates example operations associated with selecting a subset of sentence structures (for example, in connection with step/operation 1210 of FIG. 12 described above).

The example method 1300 starts at step/operation 1301.

At step/operation 1303, a computing entity (such as the data object computing entity 105 described above in connection with FIG. 1 and FIG. 2) may include means (such as the processing element 205 of the data object computing entity 105 described above in connection with FIG. 2) for setting or identifying a predetermined number for the subset of sentence structures.

In the present disclosure, the predetermined number for the subset of sentence structures refers to a number or amount of the subset of sentence structures in the subset. Similar to the step/operation 905 described above in connection with FIG. 9, the predetermined number for the subset of sentence structures may be set or identified by the computing entity based at least in part on feedback data associated with the data object processing platform/system. For example, the data object processing platform/system may receive feedback data based at least in part on user input that indicates a desired amount or number for the subset of sentence structures.

In some embodiments, the predetermined number for the subset of the sentence structures may be set or identified as five. In such embodiments, the subset of the sentence structures (and eventually the summary metadata) may include five sentence structures. In some embodiments, the predetermined number may be of other values.

Referring back to FIG. 13, at step/operation 1305, a computing entity (such as the data object computing entity 105 described above in connection with FIG. 1 and FIG. 2) may include means (such as the processing element 205 of the data object computing entity 105 described above in connection with FIG. 2) for generating an ordered list of the plurality of sentence structures.

In some embodiments, the computing entity may generate the ordered list of the plurality of sentence structures based at least in part on their corresponding sentence scores. For example, the computing entity may arrange each sentence structure within the ordered list based at least in part on its corresponding sentence score. In such an example, the ordered list of the plurality of sentence structures may represent a list of sentence structures from a sentence structure that has the highest sentence score to a sentence structure that has the lowest sentence score.

Subsequent to step/operation 1305, the example method 1300 proceeds to step/operation 1307. At step/operation 1307, a computing entity (such as the data object computing entity 105 described above in connection with FIG. 1 and FIG. 2) may include means (such as the processing element 205 of the data object computing entity 105 described above in connection with FIG. 2) for filtering the ordered list.

In some embodiments, the compute entity may remove one or more sentence structures from the ordered list that do not satisfy a character number threshold. As such, each sentence structure in ordered list (and the resultant subset of sentence structures) satisfies the character number threshold.

For example, the computing entity may set or identify the character number threshold as between 5 characters and 30 characters. In other words, a sentence structure that includes less than 0 characters or more than 30 characters may not satisfy the character number threshold, and may be removed from the ordered list. In some embodiments, the character number threshold may include other value(s) for the upper character limit and/or the lower character limit.

In some embodiments, the computing entity may remove one or more sentence structures from the ordered list that may comprise one or more keyword(s). Such keyword(s) may include, but is not limited to, conclusive words such as "therefore." In some embodiments, the computing entity may remove one or more sentence structures that indicate the health insurance claim corresponding to the training data object was approved.

In some embodiments, the computing entity may remove one or more sentence structures that have the same sentence score. For example, if two sentence structures both have the same sentence score, the computing entity may remove one of the sentence structures from the ordered list so as to eliminate repetition of sentence structures.

While the description above provides some example operations of filtering the sentence structures in the ordered list, it is noted that the scope of the present disclosure is not limited to the description above. In some examples, an example method may comprise one or more additional and/or alternative operations for filtering the ordered list.

In some embodiments, the step/operation 1303 may be performed prior to the step/operation 1305. In some embodiments, the step/operation 1303 may be performed subsequent to the step/operation 1307. In some embodiments, the step/operation 1303 may be performed at the same time with the step/operation 1305 or step/operation 1307.

Subsequent to step/operation 1303 and/or step/operation 1307, the example method 1300 proceeds to step/operation 1309. At step/operation 1309, a computing entity (such as the data object computing entity 105 described above in connection with FIG. 1 and FIG. 2) may include means (such as the processing element 205 of the data object computing entity 105 described above in connection with FIG. 2) for selecting the sentence structures.

In some embodiments, the computing entity may select the predetermined number (that is identified at step/operation 1303) of sentence structures from the ordered list (that is filtered at step/operation 1307). Continuing from the example above, the computing entity may set or identify the predetermined number for the subset of sentence structures to be five. In such embodiments, the subset of the sentence structures (and eventually the summary metadata) may include five sentence structures that have the top five highest sentence scores on the ordered list.

In some embodiments, the computing entity may generate the summary metadata for the data object based at least in part on the subset of sentence structures, similar to those described above in connection with at least step/operation 1212 of FIG. 12. In some embodiments, the summary metadata may be adjusted based on a word number threshold. For example, the computing entity may remove one or more sentence structures from the summary metadata so that it has between 62 words to 481 words. In some embodiments, the word number threshold may include other value(s) for the upper word limit and/or the lower word limit Referring back to FIG. 13, subsequent to step/operation 1309, the example method 1300 ends at step/operation 1311.

d. Exemplary Interactive User Interfaces

Referring now to FIG. 14 and FIG. 15, example interactive user interfaces are illustrated.

FIG. 14 illustrates an example user interface 1400 that may provide an example rendering of various metadata associated with an example data object in accordance with examples of the present disclosure.

The example user interface 1400 may comprise a header section 1402, which may provide rendering of basic information associated with the data object.

In the example shown in FIG. 14, the data object associated with the example user interface 1400 may be a claim data object. As such, the header section 1402 may comprise rendering 1404 of a case identifier associated with the health insurance claim (corresponding to the data object), and may comprise rendering 1406 of basic information associated with the health insurance claim, such as, but not limited to, party name associated with the health insurance claim, status of the investigation for W&E associated with the health insurance claim, and/or the like.

The example user interface 1400 may comprise a tab selector section 1408, which may be positioned under the header section 1402. The tab selector section 1408 may provide one or more tabs. Each tab may represent one or more aspects of data/information associated with the data object (such as, but not limited to, a summary of the data object, tasks associated with the data object, and/or the like). When a user selects a tab from the tab selector section 1408, the example user interface 1400 may be updated to include rendering of data/information associated with the corresponding aspect(s) of data/information associated with the data object at the tab information section 1410.

For example, as shown in FIG. 14, a user may select the summary tab from the tab selector section 1408. In response to detecting the user selection, the example user interface 1400 may be updated to include rendering of data/information associated with the data object that is under the summary tab at the tab information section 1410. Such data/information may include, but is not limited to, the name of the patient associated with the health insurance claim, the date of the birth of the patient, and/or the like.

Further, as shown in FIG. 14, the tab selector section 1408 may include an "explain" tab. In response to detecting the user selection of the explain tab, the example user interface 1400 may be updated to include rendering of data/information associated the subset of training data objects that is selected in accordance with examples of the present disclosure and/or the summary metadata that is generated in accordance with examples of the present disclosure, details of which are described in connection with at least FIG. 15.

Referring now to FIG. 15, an updated user interface 1500 subsequent to a user selection of the explain tab is illustrated.

In the example shown in FIG. 15, the updated user interface 1500 may comprise a header section 1501, similar to the header section 1402 described above in connection with FIG. 14. For example, the header section 1501 may include rendering 1503 and rendering 1505, similar to rendering 1404 and rendering 1406 described above in connection with FIG. 14. The updated user interface 1500 may include a tab selector section 1507, similar to the tab selector section 1408 described above in connection with FIG. 14.

As shown in FIG. 15, a user may select the explain tab from the tab selector section 1507. As such, the updated user interface 1500 may include renderings (such as rendering 1509, rendering 1511) and/or buttons (such as button 1513, button 1515, and button 1517).

As described above, the selection of the explain tab in the tab selector section 1507 may trigger rendering of data/information associated the subset of training data objects that is selected in accordance with examples of the present disclosure and/or the summary metadata that is generated in accordance with examples of the present disclosure.

For example, the rendering 1509 may comprise rendering of data/information associated the subset of training data objects that is selected in accordance with examples of the present disclosure. For example, the rendering 1509 may present claim numbers of training data objects, the corresponding CPT codes, an indication on whether the corresponding claim was approved, and the amount saved for denying the claim (if applicable).

Additionally, or alternatively, the rendering 1511 may comprise rendering of the summary data that is generated in accordance with examples of the present disclosure. The updated user interface 1500 may comprise one or more buttons associated with the rendering 1511. For example, the updated user interface 1500 may include an accept button (button 1513), an edit button (button 1515), and a close button (button 1517). In response to detecting a user selecting the accept button, a computing entity may update the note metadata corresponding to the claim data object based at least in part on the summary metadata as displayed in the rendering 1511. In response to detecting a user selecting the edit button, a computing entity may trigger rendering of a text editing interface, allowing a user to edit/create note metadata based at least in part on the summary metadata as displayed in the rendering 1511. In response to detecting a user selecting the close button, a computing entity may adjust the updated user interface 1500 to close the explain tab.

As such, various embodiments of the present disclosure may leverage the key insight that new health insurance claims may be identified as potentially containing W&E by a software black-box machine learning model because there were similar claims in the training data objects (for example, based at least in part on the creation of an encoding of the training data and a representation of the claim of interest in an embedded space, allowing for the straightforward determination of Euclidean distance). Examples of the present disclosure may identify similar claims and summarize their note metadata, which may improve the interpretability on why a new health insurance claim is flagged by the software black-box machine learning model. As such, various examples of the present disclosure may identify reasons behind health insurance claims being flagged, may combine information from multiple past claims in a human-interpretable way, without compromising on the performance of the software black-box machine learning model. Various examples of the present disclosure may ensure optical workface deployment, increase volume of health insurance claims reviewed by a clinical reviewer per hour, and provide savings in operation expenses.

V. Conclusion

Many modifications and other embodiments of the disclosure set forth herein will come to mind to one skilled in the art to which this disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising one or more processors and at least one memory one or more non-transitory computer readable media storing processor-executable instructions that, when executed by the one or more processors, causes the one or more processors to perform operations comprising:

receiving input feature metadata for an input data object;

providing the input feature metadata to a software black-box machine learning model to receive a predictive output comprising flag metadata, wherein the software black-box machine learning model is stored in association with a plurality of training data objects and a plurality of training feature encodings that is previously generated from the plurality of training data objects;

providing the input feature metadata to an encoder to receive an inference feature encoding for the input feature metadata of the input data object;

extracting, from the plurality of training data objects, a training data object based at least in part on a distance between the inference feature encoding and one or more of the plurality of training feature encodings within a multi-dimensional mapping space;

generating an explainable output with the flag metadata based on the training data object; and providing the explainable output with the flag metadata.

2. The system of claim 1, wherein:

(i) the plurality of training data objects comprise training feature metadata, and (ii) the operations further comprise:

(a) retrieving the training feature metadata;

(b) generating the plurality of training feature encodings by encoding the training feature metadata to a plurality of training numerical features based at least in part on an encoder algorithm; and (c) generating the inference feature encoding by encoding the input feature metadata to a numerical feature based at least in part on the encoder algorithm.

3. The system of claim 2, wherein the encoder algorithm is associated with a CatBoost encoder.

4. The system of claim 2, wherein the operations further comprise:

generating, based at least in part on the multi-dimensional mapping space, a plurality of distance metrics between the numerical feature and the plurality of training numerical features; and selecting a subset of the plurality of training data objects based at least in part on the plurality of distance metrics.

5. The system of claim 4, wherein the operations further comprise:

determining a predetermined number for the subset of the plurality of training data objects;

generating an ordered list of the plurality of training numerical features based at least in part on the plurality of distance metrics;

selecting a subset of training numerical features from the ordered list based at least in part on the predetermined number; and determining the subset of the plurality of training data objects based at least in part on the subset of training numerical features.

6. The compting system of claim 1, wherein the operations further comprise:

generating a plurality of word scores based at least in part on a subset of note metadata; and generating a plurality of sentence structures based at least in part on the subset of note metadata.

7. The system of claim 6, wherein the plurality of word scores is associated with a plurality of inverse document frequency (IDF) values.

8. The system of claim 6, wherein the operations further comprise:

generating a plurality of sentence scores that is associated with the plurality of sentence structures based at least in part on the plurality of word scores; and selecting a subset of sentence structures from the plurality of sentence structures based at least in part on the plurality of sentence scores.

9. The system of claim 8, wherein to select the subset of sentence structures, the operations further comprise:

generating an ordered list of the plurality of sentence structures based at least in part on the plurality of sentence scores; and selecting a predetermined number of sentence structures from the ordered list.

10. The system of claim 9, wherein one or more sentence structures in the subset of sentence structures satisfies a character number threshold.

11. The system of claim 8, wherein the operations further comprise:

generating explainable summary metadata based at least in part on the subset of sentence structures.

12. A computer-implemented method comprising:

receiving, by one or more processors, input feature metadata for an input data object;

providing, by the one or more processors, the input feature metadata to a software black-box machine learning model to receive a predictive output comprising flag metadata, wherein the software black-box machine learning model is stored in associated with a plurality of training data objects and a plurality of training feature encodings that is previously generated from the plurality of training data objects;

providing, by the one or more processors, the input feature metadata to an encoder to receive an inference feature encoding for the input feature metadata of the input data object;

extracting, by the one or more processors and from the plurality of training data objects, a training data object based at least in part on a distance between the inference feature encoding and one or more of the plurality of training feature encodings within a multi-dimensional mapping space;

generating, by the one or more processors, an explainable output with the flag metadata based on the training data object; and providing, by the one or more processors, the explainable output with the flag metadata.

13. The computer-implemented method of claim 12, wherein the plurality of training data objects comprise training feature metadata and the computer-implemented method further comprises:

retrieving the training feature metadata;

generating the plurality of training feature encodings by encoding the training feature metadata to a plurality of training numerical features based at least in part on an encoder algorithm; and generating the inference feature encoding by encoding the input feature metadata to a numerical feature based at least in part on the encoder algorithm.

14. The computer-implemented method of claim 13, wherein the encoder algorithm is associated with a CatBoost encoder.

15. The computer-implemented method of claim 13 further comprising:

calculating, based at least in part on the multi-dimensional mapping space, a plurality of distance metrics between the numerical feature and the plurality of training numerical features; and selecting a subset of the plurality of training data objects based at least in part on the plurality of distance metrics.

16. The computer-implemented method of claim 15 further comprising:

identifying a predetermined number for the subset of the plurality of training data objects;

generating an ordered list of the plurality of training numerical features based at least in part on the plurality of distance metrics;

selecting a subset of training numerical features from the ordered list based at least in part on the predetermined number; and determining the subset of the plurality of training data objects based at least in part on the subset of training numerical features.

17. The computer-implemented method of claim 12 further comprising:

computing a plurality of word scores based at least in part on a subset of note metadata;

and generating a plurality of sentence structures based at least in part on the subset of note metadata.

18. The computer-implemented method of claim 17, wherein the plurality of word scores is associated with a plurality of inverse document frequency (IDF) values.

19. The computer-implemented method of claim 17, further comprising:

computing a plurality of sentence scores that is associated with the plurality of sentence structures based at least in part on the plurality of word scores; and selecting a subset of sentence structures from the plurality of sentence structures based at least in part on the plurality of sentence scores.

20. One or more non-transitory computer-readable storage media including instructions that, when executed by one or more processors, cause the one or more processors to perform operations comprising:

receiving input feature metadata for an input data object;

providing the input feature metadata to a software black-box machine learning model to receive a predictive output comprising flag metadata, wherein the software black-box machine learning model is stored in association with a plurality of training data objects and a plurality of training feature encodings that is previously generated from the plurality of training data objects;

providing the input feature metadata to an encoder to receive an inference feature encoding for the input feature metadata of the input data object;

extracting, from the plurality of training data objects, a training data object based at least in part on a distance between the inference feature encoding and one or more of the plurality of training feature encodings within a multi-dimensional mapping space;

generating an explainable output with the flag metadata based on the training data object; and providing the explainable output with the flag metadata.

* * * * *